US012617620B2

(12) United States Patent
Raymond et al.

(10) Patent No.: US 12,617,620 B2
(45) Date of Patent: May 5, 2026

(54) LOAD CARRYING SYSTEM AND METHOD

(71) Applicant: 9428-3421 Québec Inc., Sherbrooke (CA)

(72) Inventors: Charles-Éric Raymond, Otterburn Park (CA); Benoît Serrano-Parent, Montreal (CA); Alexandre Charbonneau, Saint-Bernard-de-Lacolle (CA); Mathieu Labelle, Sherbrooke (CA); Francis Bouthillette, Granby (CA); Brayaan Diaz, Victoriaville (CA); Tommy Fortier, Kingsey Falls (CA); David Petitclerc, Les Coteaux (CA); Laurier Tremblay, Sainte-Lucie-des-Laurentides (CA); Pascal Beaulieu, Baie-des-Sables (CA); Anne-Marie Coupal, Gatineau (CA); Hugo Soucy, Saint-Hubert-de-Rivière-du-Loup (CA); Louis Massicotte-Morissette, Témiscouata-sur-le-Lac (CA); Marc-André Tetrault, La Présentation (CA); Francis Roy, Terrebonne (CA); Olivier Julien, Trois-Rivières (CA)

(73) Assignee: 9428-3421 Québec inc., Saint-Hyacinthe (CA)

( * ) Notice: Subject to any disclaimer, the term of this patent is extended or adjusted under 35 U.S.C. 154(b) by 361 days.

(21) Appl. No.: 18/254,410

(22) PCT Filed: Nov. 26, 2021

(86) PCT No.: PCT/CA2021/051695
§ 371 (c)(1),
(2) Date: May 25, 2023

(87) PCT Pub. No.: WO2022/109745
PCT Pub. Date: Jun. 2, 2022

(65) Prior Publication Data
US 2024/0002155 A1     Jan. 4, 2024

Related U.S. Application Data
(60) Provisional application No. 63/118,703, filed on Nov. 26, 2020.

(51) Int. Cl.
*B65G 7/04*          (2006.01)
(52) U.S. Cl.
CPC ..................................... *B65G 7/04* (2013.01)
(58) Field of Classification Search
CPC ....................................................... B65G 7/04
(Continued)

(56) References Cited

U.S. PATENT DOCUMENTS 4,098,518 A * 7/1978 Minkoff ................ B62B 5/0083
280/47.131
4,950,126 A * 8/1990 Fabiano ................ B66F 11/048
280/47.11
(Continued)

FOREIGN PATENT DOCUMENTS

CN        101885350 A      11/2010
DE          10041578 A1 *   3/2002    ................ B60P 3/40
(Continued)

OTHER PUBLICATIONS https://www.hilmanrollers.com/power-systems/tk-evo-remote-operated-dollies.
(Continued)

*Primary Examiner* — Terrell H Matthews
(74) *Attorney, Agent, or Firm* — NORTON ROSE FULBRIGHT CANADA LLP

(57)                ABSTRACT
A dolly has a frame; a plurality of rolling elements mounted on the frame for rotation about respective rotational axes
(Continued)

generally parallel to the ground surface and defining a contact footprint of the dolly on the ground surface. The axes extend in a plane between a load contacting surface of the dolly and the ground surface at a distance between 30% and 50% of a height defined between the load contacting surface of the dolly and the ground surface. A swivel platform defines the load contacting surface extending at an elevation above the frame and mounted on the frame for rotation about a platform axis located within the contact footprint. An actuator unit is drivingly engaged to at least two rolling elements of the plurality of rolling elements, the at least two rolling elements disposed on opposite sides of the swivel platform. An on-board controller unit is operable to actuate the actuator unit.

20 Claims, 11 Drawing Sheets

(58) Field of Classification Search
USPC ........................................................ 414/430
See application file for complete search history.

(56) References Cited

U.S. PATENT DOCUMENTS

| | | | | |
|---|---|---|---|---|
| 6,202,774 B1 * | 3/2001 | Claassen | ................ | B62D 57/00 |
| | | | | 180/8.5 |
| 6,430,924 B1 | 8/2002 | Waegerle | | |
| 7,278,647 B1 * | 10/2007 | Keenan | .................... | B62H 3/00 |
| | | | | 414/430 |
| 9,919,640 B2 | 3/2018 | Buckingham et al. | | |
| 11,648,800 B2 * | 5/2023 | Winters | .................... | B64F 5/50 |
| | | | | 414/426 |
| 2003/0235488 A1 * | 12/2003 | Hadar | .................... | B62B 5/049 |
| | | | | 414/495 |

FOREIGN PATENT DOCUMENTS

| | | | | |
|---|---|---|---|---|
| EP | 3712102 | 9/2020 | | |
| EP | 3712102 A1 * | 9/2020 | ............. | G05D 1/249 |
| KR | 101926345 B1 * | 12/2018 | .......... | G05D 1/0011 |
| WO | 2011061254 | 5/2011 | | |
| WO | WO-2011061254 A1 * | 5/2011 | .............. | B62B 3/04 |
| WO | 2020082185 | 4/2020 | | |

OTHER PUBLICATIONS https://oxworldwide.com/self-propelled-trolley-motorized.
https://www.ticamsrl.com/products-ticam/dumbo-trolley/.
https://www.hts-direct.com/.
https://www.toolwell.com/pdf/industrial-skate-ep15b15-details.pdf.
https://www.gksweb.com/product/robot-10/.

* cited by examiner

Solo 20

L'

HH

OC

OD

120'

Weight distribution

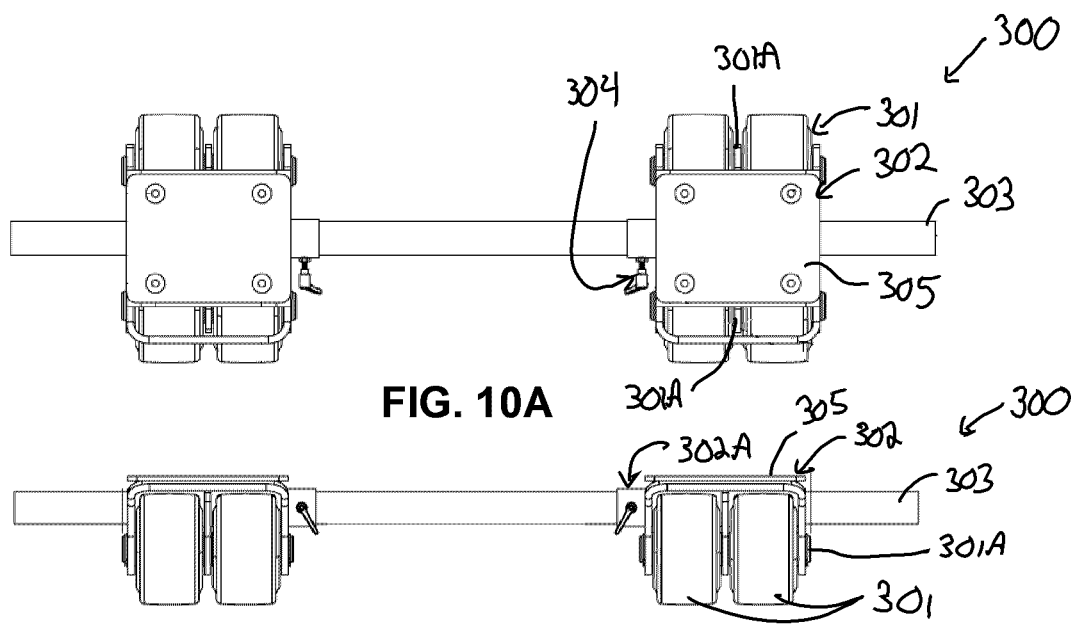
FIG. 10A
FIG. 10B
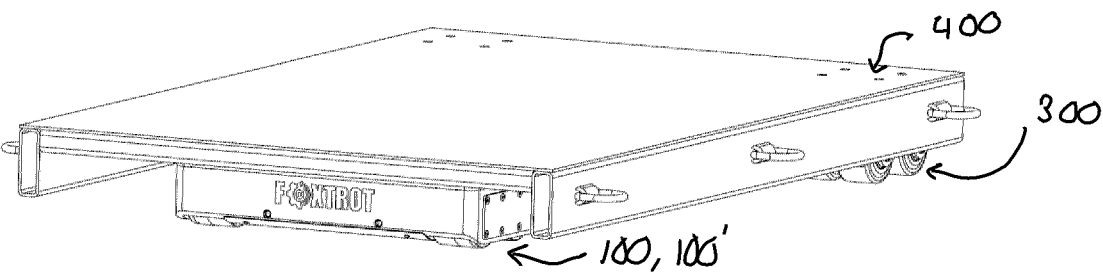
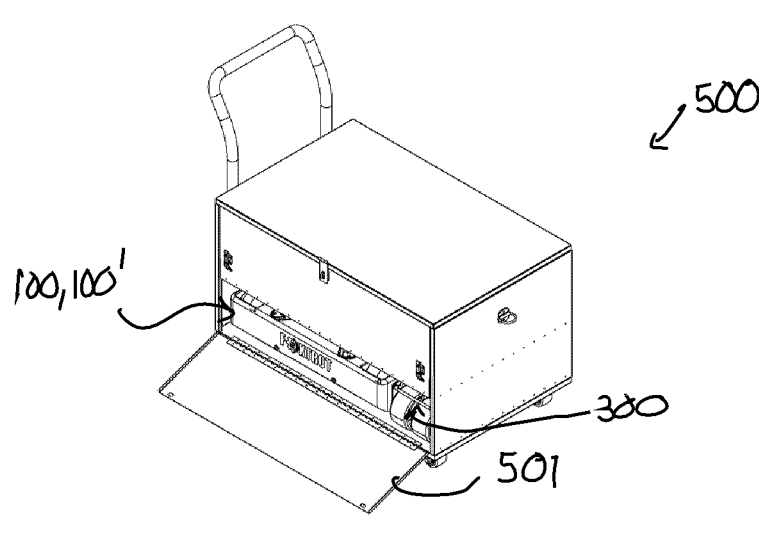
FIG. 11
FIG. 12

LOAD CARRYING SYSTEM AND METHOD

CROSS-REFERENCE TO RELATED APPLICATION

The present application claims the priority of U.S. Patent Application No. 63/118,703, filed on Nov. 26, 2020, and incorporated herein by reference.

TECHNICAL FIELD

The application relates generally to dollies and, more particularly, dollies systems and methods for transporting heavy objects.

BACKGROUND OF THE ART

Equipment carriers, also known as dollies, industrial skates or motorized trolleys are used to lift and/or transport heavy objects in facilities. For instance, heavy objects such as large/cumbersome machineries, containers, etc. may have to be moved in facilities or on sites (e.g. construction sites). Single carriers may be used to move large and heavy objects. Such carriers may be cumbersome as a result of their large dimensions and/or not versatile when it comes to transport equipment of various sizes, geometries, and/or loads.

A group of carriers may be used to displace a single equipment. GPS technologies may assist to control and/or detect the relative position between them. However, such technologies may have limited precisions on short distances, such as distances below 10-meters between the carriers.

SUMMARY

In a first aspect, there is provided a dolly for transporting a load on a ground surface, the dolly comprising: a frame; a plurality of rolling elements mounted on the frame for rotation about respective rotational axes generally parallel to the ground surface, the plurality of rolling elements defining a contact footprint of the dolly on the ground surface, the rotational axes extending in a plane PPA extending between a load contacting surface of the dolly and the ground surface, a height defined between the load contacting surface of the dolly and the ground surface, the plane PPA extending at a distance between 30% and 50% of the height; a swivel platform defining the load contacting surface, the swivel platform extending at an elevation above the frame, the swivel platform mounted on the frame for rotation about a platform axis via a bearing, the platform axis located within the contact footprint; an actuator unit drivingly engaged to at least two rolling elements of the plurality of rolling elements, the at least two rolling elements disposed on opposite sides of the swivel platform; and an on-board controller unit operatively connected to the actuator unit, the on-board controller unit operable to actuate the actuator unit.

In accordance with the previous aspects, for example, the plurality of rolling elements are at least partially recessed within the frame.

In accordance with the previous aspects, for example, the actuator unit is at least partially recessed within the frame.

In accordance with the previous aspects, for example, the bearing is located between a tangential plane passing by a top of the plurality of rolling elements and the plane PPA.

In accordance with the previous aspects, for example, the frame extends between a first tangential plane passing by a top of the plurality of rolling elements and a second tangential plane passing by a contact point of the plurality of rolling elements on the ground surface, the tangential planes parallel to each other.

In accordance with the previous aspects, for example, the frame is a single block frame, the single block frame defining cut-outs receiving the rolling elements.

In accordance with the previous aspects, for example, the height is substantially smaller than a length and/or a width of the dolly.

In accordance with the previous aspects, for example, a substantial portion of respective ones of the plurality of rolling elements is contained within the frame.

In accordance with the previous aspects, for example, the dolly has a ground clearance underneath thereof, wherein save for the ground clearance, the plurality of rolling elements fully recede within the frame.

In accordance with the previous aspects, for example, the plurality of rolling elements have a wheelbase defined between adjacent ones of the plurality of rolling elements on a same side of a meridional plane of the dolly, and a track width defined between respective contact points of opposite ones of the plurality of rolling elements on opposite sides of the meridional plane, a ratio of the wheelbase over the track width is $0.25 \pm 0.1$.

In accordance with the previous aspects, for example, the dolly has a width transverse to a meridional plane of the dolly, a ratio of the track width over the width is $0.9 \pm 0.09$.

In accordance with the previous aspects, for example, the dolly has a length L along the meridional plane, wherein the wheelbase is smaller than $0.3$ L$\pm 0.1$ L.

In accordance with the previous aspects, for example, the load contacting surface of the swivel platform extends in a plane PPB above a tangential plane PPT passing by a top of the respective ones of the plurality of rolling elements, wherein an offset between the plane PPB and the tangential plane PPT is at most 25% of the height.

In accordance with the previous aspects, for example, the offset is between 5% and 25% of the height.

In accordance with the previous aspects, for example, the dolly includes a force sensor coupled to the frame, the force sensor connected to the on-board controller unit to transmit signals indicative of a load applied on the swivel platform.

In accordance with the previous aspects, for example, the force sensor includes at least one strain gauge coupled to the frame, the strain gauge part of a Wheatstone bridge circuit.

In accordance with the previous aspects, for example, the swivel platform includes an angular encoder, the angular encoder transmitting a signal indicative of an angular position of the swivel platform relative to the frame, about the platform axis.

In accordance with the previous aspects, for example, the angular encoder is a Hall effect sensor detecting an orientation of a magnetic field as the swivel platform rotates relative to the frame about the platform axis.

In accordance with the previous aspects, for example, the plurality of rolling elements are deformable, the plurality of rolling elements are cylindrical wheels having an asymmetrical profile in an undeformed state, the cylindrical wheels having a variable outer diameter and circumference, the variable outer diameter and circumference defining a larger outer diameter and circumference axially offset from a centerline of the cylindrical wheel.

In accordance with the previous aspects, for example, the actuator unit includes a motor and a torque transmitter drivingly engaged to a respective one of the at least two rolling elements.

In accordance with the previous aspects, for example, the motor is a servomotor operatively connected to the on-board controller unit, the on-board controller unit monitoring speed thereof.

In accordance with the previous aspects, for example, the torque transmitter includes a chain and gears arrangement drivingly engaged to a respective one of the at least two rolling elements.

In accordance with the previous aspects, for example, the dolly includes at least two pairs of axles supporting respective ones of the plurality of rolling elements, the at least two pairs of axles disposed on opposite sides of the meridional plane of the dolly, the at least two pairs of axles each including one of the at least two rolling elements drivingly engaged to the actuator unit, the axles of each one of the at least two pairs of axles are drivingly engaged by a torque transmitter.

In accordance with the previous aspects, for example, the torque transmitter is a chain and gears arrangement.

In accordance with the previous aspects, for example, the dolly includes a casing enclosing the on-board controller unit, the casing is coupled to the frame in a cantilevered fashion, a clearance gap is defined between the casing and the ground surface, the clearance gap greater than that between the frame and the ground surface.

In a second aspect, there is provided a dolly system for transporting a load, the dolly system comprising: at least one dolly of any one of the previous aspects; and at least one load skate supporting part of the load, the at least one load skate defining a trailing support cooperating with the at least one dolly to transport the load, the at least one load skate immovable relative to the at least one dolly when the load is supported thereon, the at least one load skate including at least a frame and a plurality of rolling elements mounted to the frame.

In accordance with the second aspect, for example, the at least one load skate includes a platform supported by the swivel platform of the at least one dolly and the at least one load skate, the platform interfacing with the at least one dolly, the at least one load skate and the load.

In accordance with the previous aspects, for example, the dolly system includes at least two dollies of any one of the previous aspects, the at least one load skate including a lidar for generating, transmitting and/or receiving signals/data indicative of a position and/or orientation of the at least two dollies relative to the at least one load skate.

In accordance with the previous aspects, for example, the lidar is mounted on the frame of the at least one skate laterally outwardly relative to the rolling elements of the at least one skate.

In accordance with the previous aspects, for example, the at least one load skate includes a platform for receiving the load, the platform protrudes upwardly from a remainder of the at least one load skate.

DESCRIPTION OF THE DRAWINGS

Reference is now made to the accompanying figures in which:

FIG. 4A is a perspective view of the dolly of FIGS. 2A-2C;

FIG. 4B is a magnified view of a swivel platform of the dolly shown in FIG. 4A;

FIG. 10A is a top view of a load skate according to an embodiment;

FIG. 10B is a front elevation view of the load skate of FIG. 10A;

FIG. 11 is a perspective view of a dolly system, according to another embodiment;

FIG. 12 is another perspective view of the dolly system as part of a kit, in a transport case;

DETAILED DESCRIPTION

Figure 1:
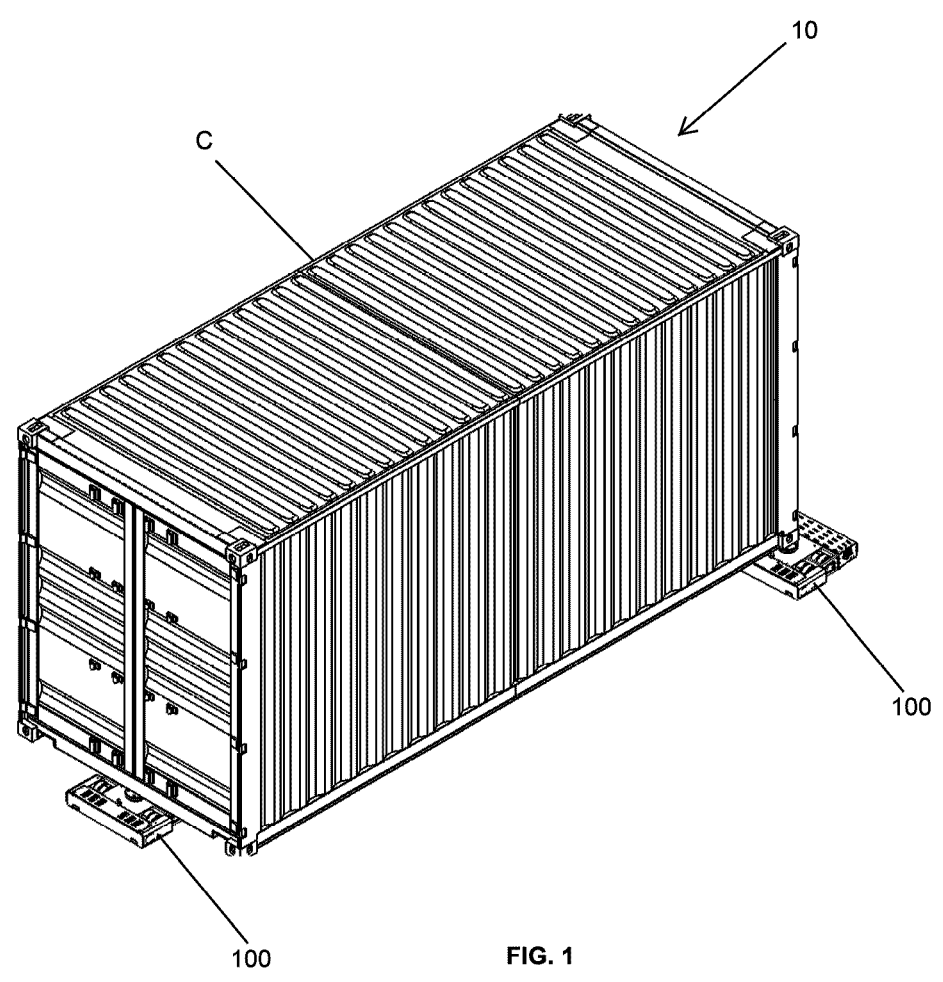
FIG. 1 is a perspective view of a dolly system transporting a load, according to an embodiment.

FIG. 1 illustrates a dolly system 10 for transporting large loads, here an intermodal container C (or shipping container). The dolly system 10 is adapted to displace heavy and/or cumbersome objects, for instance. The dolly system 10 may be adapted to transport between about 10 tons and 50 tons loads. The dolly system 10 may be adapted to transport loads of more than 50 tons, for instance up to 200 tons. The system 10 comprises at least two dollies 100. In an embodiment the dolly system 10 is adapted to transport 10 tons±2 tons per dolly 100. In the depicted embodiment, the system 10 has three dollies 100, though there could be more in other embodiments. While the dolly 100 may be part of a dolly system 10 as further described herein, each dolly 100 may be operated independently as a single unit to transport a load.

The dollies 100 may work in unison to displace the load on a ground surface. The dollies 100 are controlled wirelessly, though wired communication could be contemplated even though less convenient. A controller unit, on the basis of speed, angles, and/or loads measurements acquired from the dollies 100, may control the movement of the dollies 100 in unison and their relative position during movement. Movement of the dollies 100 on the ground surface is omnidirectional. In the depicted embodiment, the dollies 100 may roll on the ground surface, provided such ground surface has no or only small reliefs (e.g. cracks, asperities, expansion joints, etc.) such as concrete floors, pavement, or the like. The dollies 100 in other embodiments may be configured to roll on uneven and/or rugged surfaces, such as at a construction site (e.g. indoor or outdoor), where ground surfaces may include sand, gravel, and/or soil or dirt, for instance.

Figures 2A, 2B:
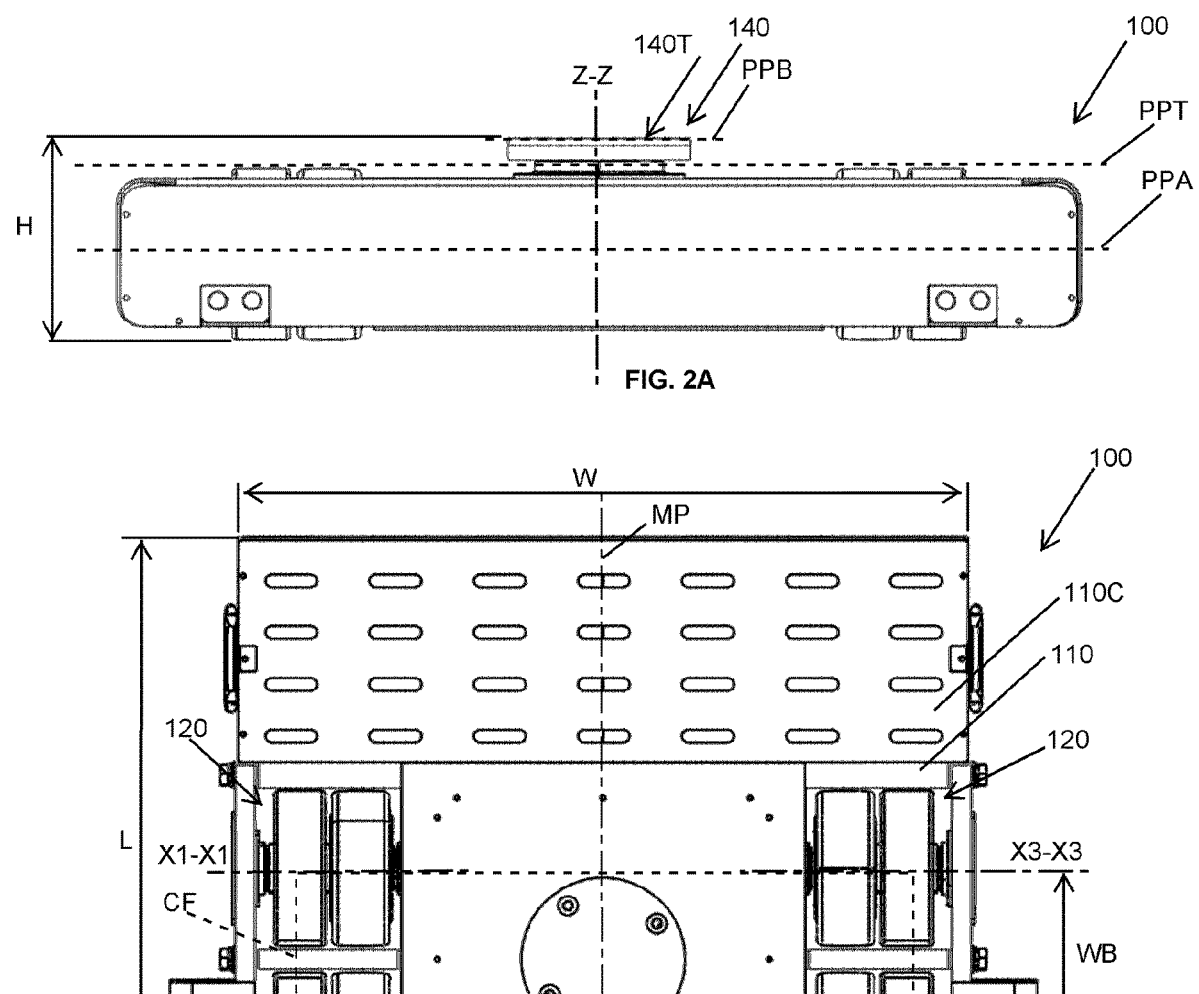
FIG. 2A is a side elevation view of a dolly of the system, according to an embodiment.
FIG. 2B is a top view of the dolly of FIG. 2A.
Figures 2C, 3:
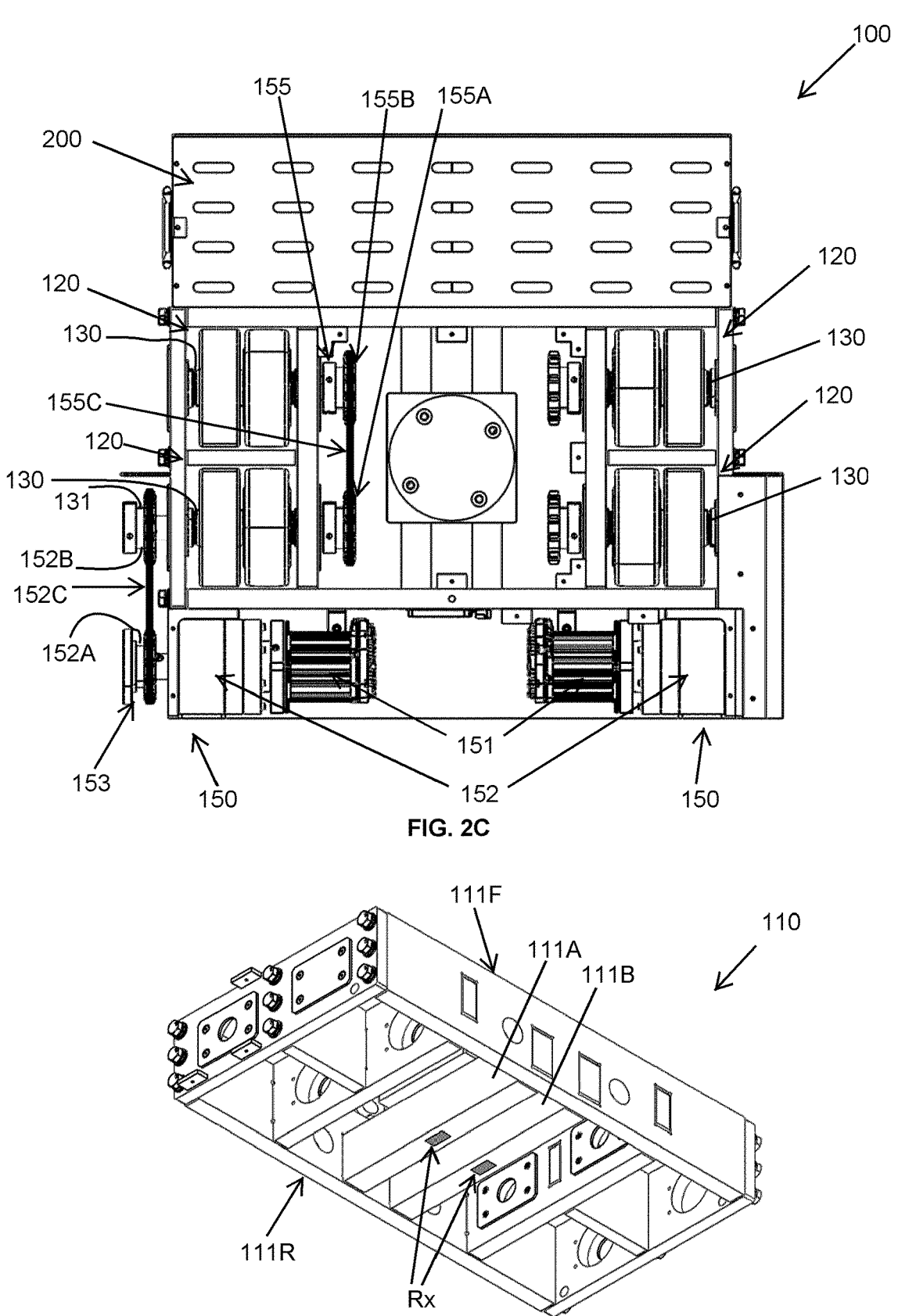
FIG. 2C is another top view of the dolly of FIGS. 2A-2B.
FIG. 3 is a perspective view of a frame of the dolly of FIGS. 2A-2C.

FIGS. 2A to 2C illustrate one of such dollies 100 according to an embodiment. In the depicted embodiment, the dolly 100 has a generally rectangular shape (i.e. rectangular prism). In other embodiments, the overall shape of the dolly 100 may be different, such as cylindrical, hexagonal (or other polygonal shapes). The dollies 100 are generally compact, considering the loads (e.g. 10+ tons) they may support. The dolly 100 has a low profile. It may be desirable to limit a total height of the dolly 100 so as to limit the lifting of the carried load onto the dolly 100. The carried load may remain close to the ground surface when supported by the dolly 100 having a low profile. A maximal ("overall") height H is substantially smaller than a length L and/or a width W of the dolly 100. For instance, in an embodiment, a ratio of L/H and/or W/H may be between 2.5 and 5. Such ratio may be greater in other embodiments. However, compactness of the dolly 100 may be desired to facilitate handling. At least for similar reasons, the length L and/or width W to maintain a small footprint of the dolly 100 on the ground. In some embodiments, the length L is smaller than the width W.

In the depicted embodiment, the dolly 100 has a width W of 845 mm±50 mm, and length L of 750 mm±50 mm. The dolly 100 has a maximal height H of 175 mm±10 mm. The maximal height H may be measured from the tangential plane of the rolling elements on the ground surface and the plane PPB or top surface 140T of the platform 140, described hereafter. Other dimensions may be contemplated, depending on the embodiments. For instance, the width W and length L may vary between 500 and 1000 mm, or even less than 500 mm, and the height H may vary between 100 mm and 300 mm, depending on the embodiments. For instance, in another exemplary dolly 100 shown in FIGS. 8A to 8D, the dolly 100 may have a width W of 600 mm±50 mm, a length L of 370±50 mm, and a maximal height H of 130±50 mm. In yet another exemplary dolly 100 shown in FIGS. 9A, the dolly 100 has a width W of 750 mm±50 mm and a length L of 500 mm±50 mm, with a maximal height H of 175 mm±10 mm. Those are provided as additional variants.

The dolly 100 has a frame 110. The frame 110 supports the components of the dolly 100. The frame 110 may be considered as the "skeleton" of the dolly 110. Components of the dolly 100 are mounted to the frame 110. The dolly 100 includes a cover 110C which encloses at least partially the frame 110 and other components of the dolly 100. The cover 110C may be made of one or more panels coupled to the frame 110, for instance. Such cover 110C may protect internal components of the dolly 100 from impacts with external objects, though the cover 110C is optional.

The frame 110 provides the rigidity to support the carried load. The frame 110 is adapted to limit bending and/or deflection when the carried load is supported thereon. The frame 110 extends in the heightwise direction of the dolly 100 over a substantial portion of the maximal height H thereof. The frame 110 may extend between tangential planes passing by the top (highest point) of the respective rolling elements 120 and the contact point on the ground (or lowest point). The frame 110 is generally flat in a side elevation view, and may extend generally parallel (±5 degrees) to the tangential planes. In at least some embodiments, the frame 110 has at least 0.7H in the heightwise direction. In other embodiments, the frame 110 may be thinner, e.g., at most 0.7H, in the heightwise direction to further reduce weight and/or the height H of the dolly 100, provided the frame 110 has the capacity to support the carried load contemplated.

The dolly 100 has a plurality of rolling elements 120 mounted for rotation about respective rotational axes X1-X1, X2-X2, X3-X3, X4-X4 relative to the frame 110. The rotational axes X1-X1, X2-X2, X3-X3, X4-X4 are generally parallel (±5 degrees) relative to the ground surface (or flat reference surface). The rolling elements 120 define respective contact points (or patches) of the dolly 100 on the ground. The dolly 100 may have two, three, or more pairs of axles 130 disposed on opposite sides of a meridional plane MP of the dolly 100 depending on the embodiments. In an embodiment, such as shown, the rotational axes X1-X1, X2-X2, X3-X3, X4-X4 are parallel to each other. A contact footprint CF of the dolly 100 on the ground surface is defined by the contact points of the rolling elements 120. As shown, the contact points of the rolling element 120 may define corners of a quadrilateral, which may be generally rectangular. The rotational axes X1-X1/X3-X3, and X2-X2/X4-X4 are collinear (collinear or coextensive) in the embodiment shown but they may not be in other embodiments. For instance, the rotational axes X1-X1/X3-X3, and X2-X2/X4-X4 may be offset heightwise in other embodiments. The rolling elements 120 are coupled to respective axles 130. The axles 130 may be rotatably mounted to the frame 110 in various ways, for instance via bearings (e.g. roller bearings, ball bearings, journal bearings, etc.). In the depicted embodiment, each axle 130 has a plurality of rolling elements 120 mounted thereto, though a single rolling element 120 per axle 130 may be contemplated in other embodiments, such as shown in FIGS. 8A to 8D and 9A. The number of axles 130 and/or rolling elements 120 on the dolly 100 may vary depending on the maximum payload the dolly 100 may support. For instance, dollies 100 may have 8 axles 130, with correspondingly more rolling elements 120, which may allow more tonnage capabilities. For greater compactness of the dolly 100, the rolling elements 120 are at least partially recessed within the frame 110. As shown, a substantial portion (greater than 80% of a heightwise dimension) of the rolling elements is contained within the frame 110. In an embodiment, save for the ground clearance underneath the dolly 100, the rolling element 120 may fully recede within the frame 110 (see FIG. 8B-8C for instance). As shown in FIG. 2A, the rotational axes X1-X1, X2-X2, X3-X3, X4-X4 are located in a plane PPA, which may be in at least some embodiments at an elevation from the ground that is between 30% and 50% of the maximal height H.

In the depicted embodiment, the rolling elements 120 are cylindrical wheels. Dimensions of the wheels may vary depending on the embodiments. The wheel diameters may be selected to be large enough to facilitate crossing expansion joints of a concrete floor, for instance, depending on the intended application. The wheel width and/or harness may also be selected to provide suitable load distribution on the ground surface, to avoid (avoid or limit) damages and/or slippage of the dolly 100 during motion. For instance, in some embodiments, the wheels may have an outer diameter between 50 mm and 300 mm and/or a width between 30 mm and 300 mm. In a particular embodiment, the wheels are 102 mm (±5 mm) wide and have a 152 mm (±5 mm) outer diameter. The wheels may be made of different materials. In an embodiment, the wheels are polymeric wheels (i.e. at least the riding surface of the wheels are made of a polymeric material, such as polyamide, polyurethane, etc.), which may provide a desired level of adherence/friction and/or resiliency on the ground surface during motion. For instance, in an embodiment, the riding surface of the wheels has a 60D hardness. Wheels may be spherical wheels in other embodiments.

Location of the rolling elements 120 on the dolly 100 may be selected such as to minimize the overall dimensions of the dolly 100 and/or limit friction/rotational resistance of the dolly 100 on the ground surface. For instance, in an embodiment, a track width TW of the wheels, taken in a direction transverse to the meridional plane MP, is 762 mm (±5 mm), though this may vary depending on the embodiments (e.g. 762 mm±25 mm). The track width TW may be measured between a centerline of the rolling elements on opposite sides of the dolly 100, and/or between the contact points of such rolling elements. In embodiments where there are a plurality of rolling elements on opposite sides of the dolly 100, the track width TW may be measured with respect to the outwardmost rolling elements 120 of the dolly 100. It may be desirable to maximize the track width TW for a given dolly 100, which may contribute to minimizing the rotational resistance of the dolly 100 on the ground surface. A larger track width TW may increase a radius of curvature of the curved trajectory of the rolling elements when the dolly 100 turns on itself about rotational axis Z-Z. However, for compactness of the dolly 100, the track width TW is limited in practical applications. It may also be desirable to minimize a wheelbase WB—distance between adjacent axle 130 on a same side of the meridional plane MP—for similar reasons. In at least some embodiments, a ratio of the wheelbase WB over the track width TW is 0.25±0.1. For instance, in an embodiment, the wheelbase WB is 178 mm (±5 mm), though this may vary depending on the embodiments (e.g. 178 mm±80 mm). Compactness of the dolly 100 may be obtained by having the greatest track width TW for the width W of the dolly 100. In at least some embodiments, a ratio TW/W may thus be maximized, i.e. 0.9±0.09. For similar reasons, the wheelbase WB may be 0.3 L±0.1 L.

By minimizing the wheelbase WB, rotation of the dolly 100 about the rotational axis Z-Z (described below) may be facilitated. In such motion, the rolling elements 120 may follow more closely a curved trajectory without side shifting or skidding (skidding or "lateral drifting"). Minimizing the wheelbase WB may thus reduce the rotational resistance of the dolly relative to the ground, in particular where heavy loads are supported by the dolly 100. In at least some embodiments, minimizing the wheelbase WB may include limiting a distance, here taken in the lengthwise direction of the dolly 100, between the rotational axes X1-X1, X2-X2, X3-X3, and X4-X4 of the rolling elements 120 and the rotational axis Z-Z (described below).

The dolly 100 includes a swivel platform 140 (or simply "platform"). The platform 140 defines a load contacting surface. The platform 140 is adapted to receive (receive or support) the object (e.g. container or other object loaded on the dolly 100). The platform 140 extends at an elevation above the frame 110. In other words, the platform 140 is mounted on the frame 110 and protrudes upwardly from a remainder of the dolly 100. A vertical clearance is defined between the platform 140 and a remainder of the frame 110. Such vertical clearance may limit interference between the remainder of the dolly 100 and parts of the loaded object, for instance when the dolly 100 rotates relative to the loaded object and/or ground surface. In other words, the platform 140 defines the only point of contact between the dolly 100 and the object to be displaced.

The platform 140 is mounted for rotation about a rotational axis Z-Z relative to the frame 110. The rotational axis Z-Z of the platform 140 is located at the meridional plane MP and generally between the pair of axles 130 in a direction along the meridional plane MP. Stated differently, the meridional plane MP is a transverse plane of the dolly 100 relative to the rotational axes X1-X1, X2-X2, X3-X3, X4-X4. The rotational axis Z-Z is located in the meridional plane MP, normal to the rotational axes X1-X1, X2-X2, X3-X3, X4-X4. The rotational axis Z-Z is located between axes X1-X1 and X2-X2, and between axes X3-X3 and X4-X4 in a direction taken along such plane MP. The rotational axis Z-Z is located within the quadrilateral formed by the contact points of the rolling elements 120. In some case, the rotational axis Z-Z is at the center of the quadrilateral (or other polygons, depending on the number of contact points). At least in some embodiments such location of the rotational axis Z-Z corresponds to a center point of the frame 110. Yet, in at least some embodiments, the rotational axis Z-Z is the center of rotation of the dolly 100 when the dolly 100 turns on itself. When dollies 100 support a load, such as container C of FIG. 1, and move on the ground surface, the dollies 100 may rotate on themselves while maintaining a fixed (fixed or substantially fixed) orientation/location of the container C relative to the ground surface.

While the vertical clearance is contemplated, it is desired to limit the maximal height H of the dolly 100, as described above. The platform 140 has a top surface 140T which may contact, directly or via a contact padding of the platform 140, the carried load. The top surface 140T extends in a plane PPB parallel to the plane PPA of the rotational axes X1-X1, X2-X2, X3-X3, X4-X4 of the rolling elements 120. The plane PPB is at a distance from the plane PPA that is smaller than 0.6H (±0.11H).

A tangential plane PPT passing by a top or peak (highest point) of the rolling elements 120 is shown in FIG. 2A. The tangential plane PPT is parallel to the plane PPA and/or plane PPB. In the depicted embodiment, the tangential plane PPT extends below the plane PPB. An offset of plane PPT and plane PPB may be minimized. For instance, in at least some embodiments where the rolling elements 120 are not entirely recessed within the frame 110, save for the ground clearance underneath the dolly 100, the offset between the plane PPT and the plane PPB is at most 25% of the maximal height H. In some embodiments, the offset between the plane PPT and the plane PPB is between 5% and 25%. Yet, in some other embodiments, the plane PPB may be coplanar with the plane PPT. Other aspects of the platform 140 will be described later.

As shown in FIG. 2C, the dolly 100 includes an actuator unit 150 adapted to induce motion of the dolly 100 relative to the ground. There may be more or less actuator unit(s) 150 in other embodiments. The actuator unit 150 includes a motor 151 and a torque transmitter 152 drivingly engaged to a respective pair of axles 130. One actuator unit 150 may be construed as including a plurality of motors 151 and torque transmitter 152, each drivingly engaged to a respective pair of axles 130, or each motor 151 and torque transmitter 152 may be considered part of a respective actuator unit 150. In the latter case, the dolly 100 may be construed as having a plurality of actuator units 150.

In the depicted embodiment, the motors 151 are servomotors. Actuating signals may be sent to the servomotors as speed and/or direction signals. Other types of input signals may be contemplated, e.g., torque signals. During operation of the dolly 100, speed of the dolly 100 may be measured via the servomotors, for instance via processing of angular increments of the servomotors, e.g. by the controller unit 200. Such measured speed may serve in a control loop of the controller unit 200, as will be described in further details below. The torque transmitter 152 of the actuator units 150 may be a gearbox, as is the case in the embodiment shown, such as a reduction gearbox, torque reductor, with or without clutch, for instance.

Driving engagement between one such actuator unit 150 and a pair of axles 130 may be made for instance, in an embodiment, by a chain and gears arrangement. As shown, an output end 153 of the torque transmitter 152 includes a gear 152A (gear or sprocket). Also shown, the adjacent one of the axles 130 includes a gear 152B at an end 131 thereof. In the depicted embodiment, the chain 152C is looped about the respective gears 152A, 152B to transmit torque from the output end 153 of the torque transmitter 152 to the pair of axles 130. Although described for one side of the dolly 100, it should be understood that, in the depicted embodiment, the other side of the dolly 100 is configured the same way.

The pair of axles 130 on a same side of the dolly 100 are drivingly engaged to each other via another torque transmitter 155. In the depicted embodiment, such torque transmitter 155 between the axles 130 is a chain and gears arrangement, similar to that discussed above. The chain 155C is looped about gears 155A, 155B coupled to respective ends of the axles 130. As such, each motor 151 is drivingly engaged to a respective pair of axles 130, via the torque transmitters 152, 155. In other embodiments, only one axle 130 per side of the dolly 100 may be driven by the actuator unit(s) 150. As such, the dolly 100 may include only two actuated rolling elements 120 and/or axles 130 in some embodiments. There may be two actuated rolling elements 120 and/or axles 130, and one or more unpowered ("passive") rolling elements 120 and/or axles 130 in other embodiments.

The torque transmitters 152, 155 may be different and/or include different components in other embodiments such as, for instance, drive belts, straps, such as toothed straps, pulleys, intermeshing gears arrangement, reductors, etc.

The actuator units 150 may be operated individually, such that only one pair of axles 130 may be driven at an instant time, or each pair of axles 130 may be driven at a different power level to induce omnidirectional movements to the dolly 100 (e.g. back an forth, and/or angular).

Tight tolerances and constant tension in the chain 155C between the pair of axles 130 may be desired, in that it may prevent backlash between angular position of the motors 151 versus that of the rolling elements 120. In the depicted embodiment, the gears have ten teeth, and the chain pitch is 25.4 mm. A center distance between the axles 130 is 178 mm. In at least some embodiments, the center distance (wheelbase) is 178.05 mm, and having such extra 0.05 mm may prevent backlash. These dimensions are given as examples. For instance, the gears may have less or more teeth (e.g. 7, 8, 9, 11, 12, 13, etc.), the chain pitch may be less or more than 25.4 mm (25.4 mm±13 mm) and wheelbase in other embodiments.

Figure 16:
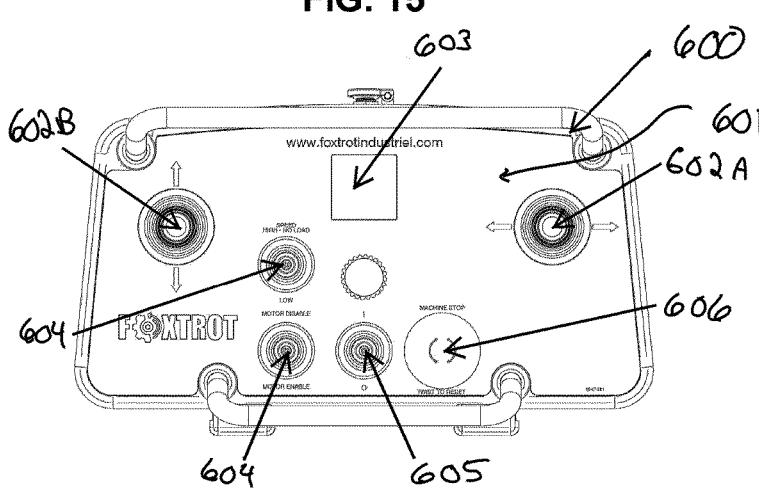
FIG. 16 is an exemplary external controller for one or more dollies, according to an embodiment.

The controller unit 200 is configured to allow communication (e.g. electronic signals, soundwaves, light, such as infrared, etc.) between the dollies 100 of the system 10. The controller unit 200 may include components allowing wireless connection and/or communication between the dollies 100 of the system 10 and/or between the dollies 100 and an external controller (FIG. 16). The controller unit 200 is shown on-board (i.e. as part of the dollies 100). The controller unit 200 may include external devices, such as computer devices of a controller/operator station/module, which may be remote from the dollies 100 and adapted to communicate with one or more of them. Other aspects of the controller unit 200 are described in further details below.

The frame 110 provides the structural integrity of the dolly 100 during normal operating conditions (e.g. below design maximum payload, during use of the dolly system 10 to displace a load). However, at least one member of the frame 110 may deform upon application of the load on the dolly 100. Although deformation may be in the range of micro deformations that are not visible through eyes, deformation of such member of the frame 110 may be detected, using load cells, strain gauges, or other sensors.

Referring to FIG. 3, in at least some embodiments, the frame 110 includes a first and a second main beams 111A, 111B. In FIG. 3, the beams 111A, 111B extend longitudinally from a rear end 111R to a front end 111F of the frame 110. The main beams 111A, 111B are spaced apart from each other in a direction transverse to their length. Other orientations of the main beams 111A, 111B and/or other frame arrangements may be contemplated. In the depicted embodiment, the beams 111A, 111B are instrumented so as to measure their deformation upon application of the load on the platform 140/dolly 100. Strain gages, i.e. at least one strain gauge Rx on one of the beams 111A, 111B, is/are electrically coupled to a Wheatstone bridge. In other words, in the depicted embodiment a single strain gauge Rx is part of a Wheatstone bridge circuit. The location of the strain gages Rx may be selected to optimize a reading of micro-deformation due to bending of the beam(s) (i.e. bend and/or deflection), at a maximal deformation area of the beam(s). In the depicted embodiment, the strain gauge Rx is located at a middle length of one of the beams 111A, 111B. Electrical connection in the Wheatstone bridge circuit in an embodiment is of the quarter bridge type. The Wheatstone bridge circuit may be of the half bridge type in other embodiments. Electrical connection in a half bridge type may limit measurement variation and/or precision due to temperature changes, for instance. Other circuit arrangement may be implemented to compensate for the effect of the temperature changes, such as full bridge circuit, or a plurality of separate bridge circuits for redundant and/or correction measurement, for example. Upon calibration of the Wheatstone bridge circuit and/or complementary conditioning circuit (e.g. calibration by known methods), micro-deformations at the surface of the beam 111A, 111B where the strain gauge Rx is applied may induce a voltage variation in the Wheatstone bridge, whose voltage variation may be measured (e.g. by the controller unit 200, and/or a signal acquisition device), converted from an analog signal to a numerical signal (e.g. by a conditioning circuit, which may or may not be part of the controller unit) and associated with a known load. The load applied on the swivel platform 140 may thus be deducted. Other force sensors may be contemplated in other embodiments, for instance load cells, such as piezo-electric crystal load cells, capacitive load cells, coupled to the frame 110. More than one force sensors, such as duplicates or different types of force sensors, may be part of the dolly 100 in various embodiments.

While the force sensing arrangement described above were considered in such configuration of the frame 110 with the beams 111A, 111B, other frame architecture may be contemplated. For instance, there may be a single main beam, such as a central beam, an off-centered beam, or other structures (e.g., struts, rods, bars, plates, etc.), forming part of the frame 110 for instance, instrumented with one or more force sensors to deduct or measure a load applied on the swivel platform 140.

The loaded object supported by a plurality of dollies 100 may apply an uneven load on each one of the dollies 100. Such uneven load may affect the precision of the controlled movement of each dolly 100. An uneven load may induce radial forces, instead of a purely axial force. Referring to FIG. 4A, radial forces applied at the platform 140 are illustrated as radial force vectors Fx, Fy, and the axial force is illustrated as the axial force vector Fz. Such radial loads may also be generated when the dollies 100 move on uneven ground surfaces (i.e. not fully flat surfaces) and/or when the movement trajectory of each dolly 100 is not substantially properly aligned with respect to one to another. Monitoring the radial forces applied on the platform 140 during movement of the dollies 100 may allow maintaining a more precise movement of the dollies 100 during displacement of the loaded object. Referring to FIG. 4B, a force sensor 160 is located underneath the platform 140 (i.e. between the platform 140 and the frame 110). In the depicted embodiment, the force sensor 160 includes a plurality of deformable stems 161 extending between the platform 140 and a stem receiving portion 110S of the frame 110. In the depicted embodiment, there are 4 stems 161, though there may be less or more (e.g. 2, 6, 8, etc.) in other embodiments. As shown, the stems 161 extend upwardly from the frame 110. If the dolly 100 rests on a horizontal surface (or plane), such stems 161 may be referred to as vertical stems. The stems 161 are positioned such as to be parallel to the axial force vector Fz.

Figure 4C:
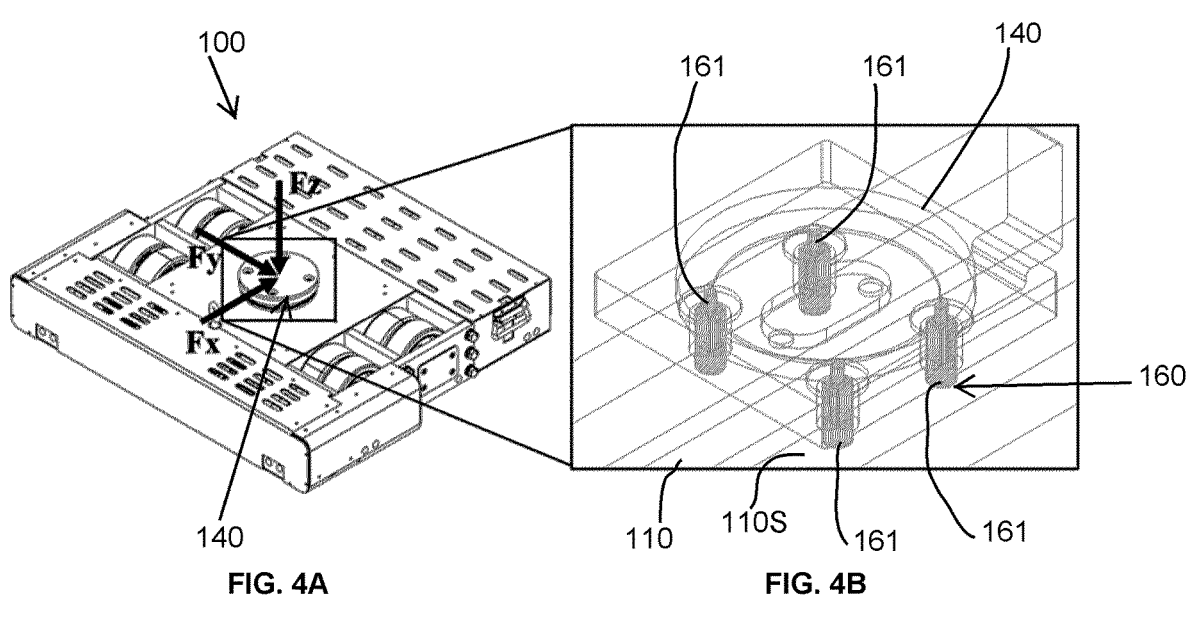
FIG. 4C is an illustration of a stem of the swivel platform of FIG. 4B.
Figure 4C:
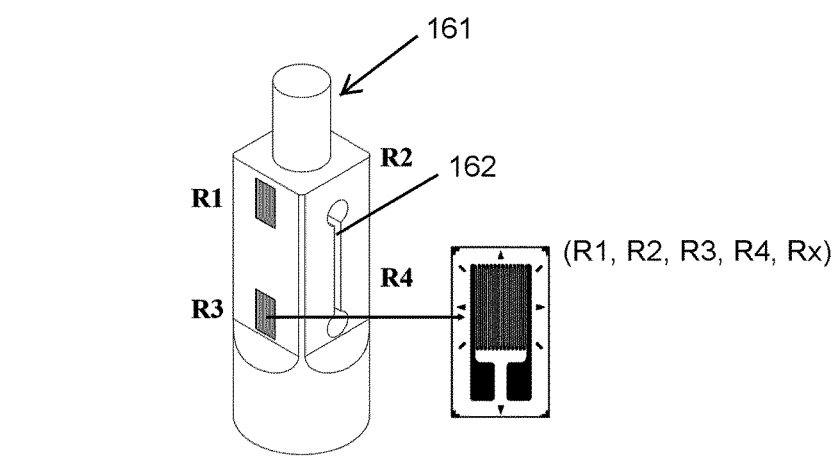

FIG. 4C illustrated one of such stems 161. As shown, the stem 161 has a longitudinal slot 162 that extends thereacross, thereby defining a selected bending direction. The longitudinal slot 162 "weakens" the stem 161 in the selected bending direction, such as to have the stem 161 more prone to bending in this direction. Such bending direction may be referred to as a "preferred" bending direction to facilitate understanding. The stem 161 has a plurality of strain gages applied to its surface. In the depicted embodiment, the stem 161 includes 4 strain gages (R1, R2, R3, R4), connected together to form a full bridge Wheatstone bridge circuit.

In the depicted embodiment, only two of the stems 161 are instrumented with the strain gages as described above. The instrumented stems 161 are configured to measure, respectively, the force amplitude along the vector Fx and the force amplitude along the vector Fy, i.e. the radial forces in two normal directions. The instrumented stems 161 are positioned such that their respective longitudinal slot 162 and/or preferred bending direction are oriented at 90 degrees (±1 degrees) relative to each other. As such, upon calibration of the Wheatstone bridge circuit of each instrumented stem 161 and/or suitable signal conditioning, a force value along Fx and Fy may be obtained. In other embodiments, all stems 161 could be instrumented. For instance, this could provide redundancy in the measurement of the radial forces, which may be desirable to reduce error margins in the calculi of the forces at the platform 140, though this may increase the amount of signal conditioning and calibration. In other embodiments, the stems 161 may have other shapes (e.g. cylindrical, with or without slot 162). Other force sensors 160 may be contemplated to monitor radial forces (i.e. at least the radial forces) at the platform 140. Radial forces applied on the platform 140 may be monitored differently in other embodiments. For instance, deformation of the frame 110 at selected locations where deformation is maximum for calibration load cases (virtual or real load cases) may be measured via gage. Signals acquired from the gage may be processed (e.g. controller unit 200, machine learning, . . . ). Associations between the acquired signals and force amplitude along the vectors Fx, Fy and Fz may be made. Computation of the acquired signals may be used to deduct the force amplitude along the vectors Fx, Fy and Fz.

Figure 5A:
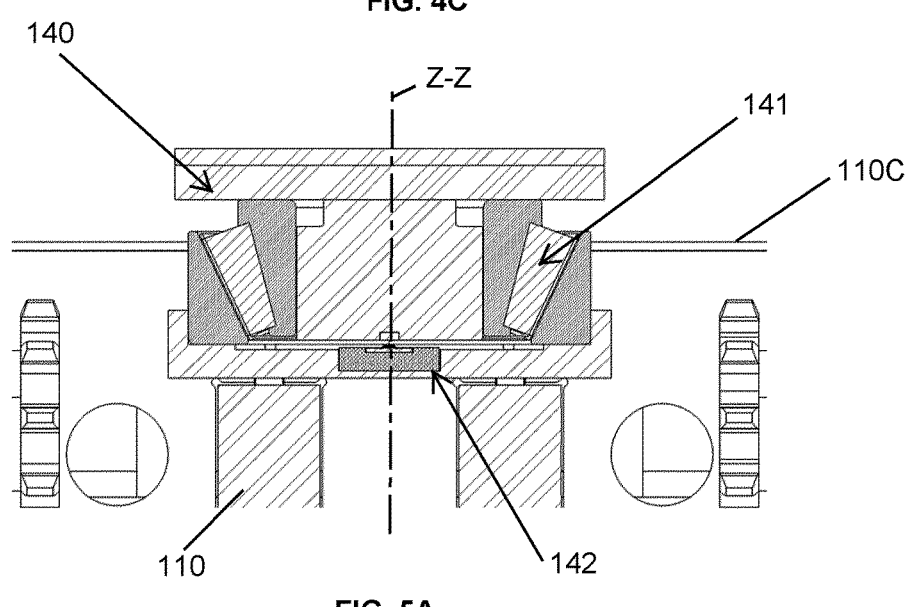
FIG. 5A is a cross-section of the swivel platform of FIGS. 4A-4B.
Figures 5B, 6A, 6B, 6C, 6D:
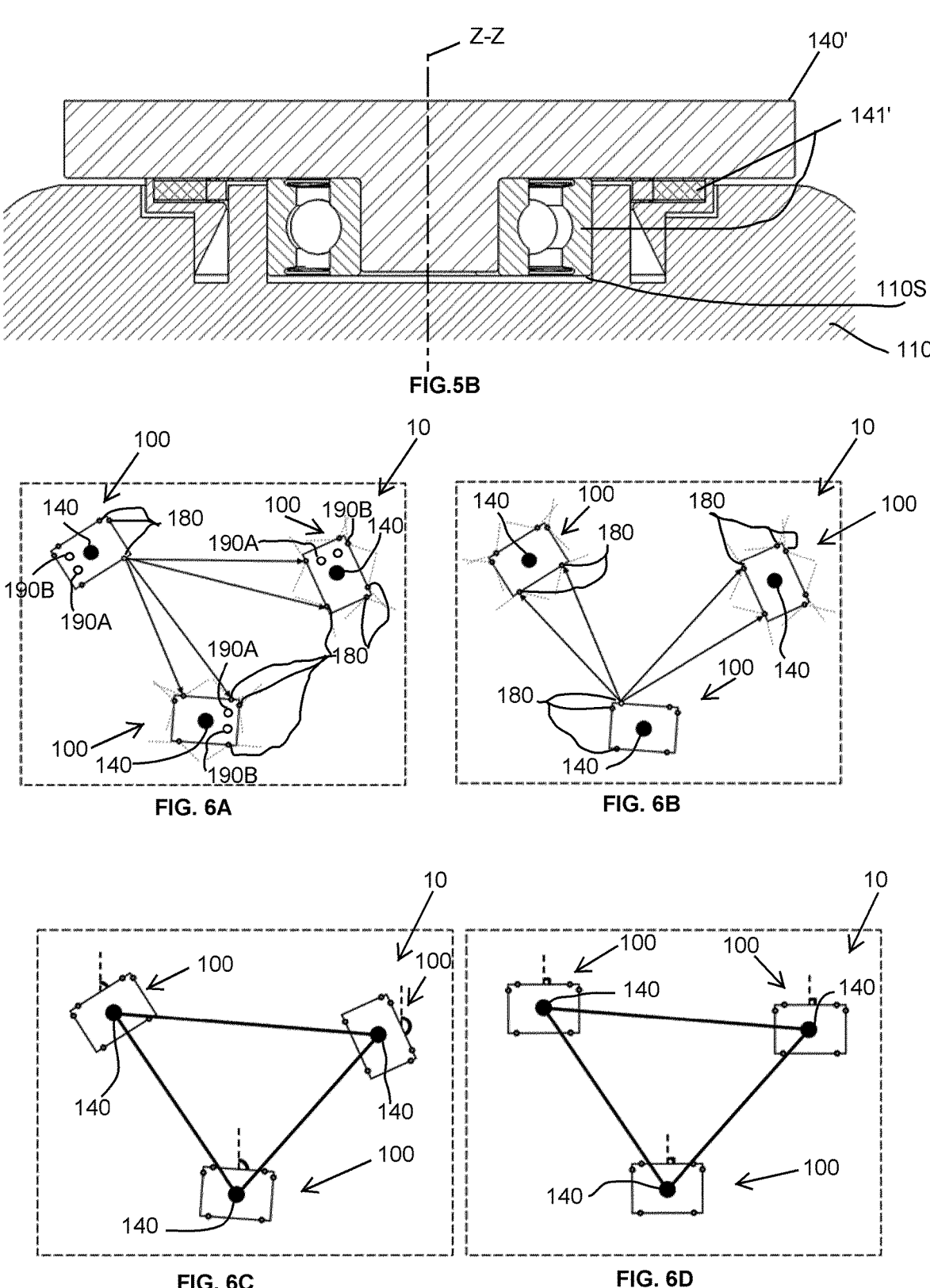
FIG. 5B is a cross-section of the swivel platform of FIGS. 4A-4B according to a variant.
FIGS. 6A-6D are illustrations of a plurality of dollies of the system of FIG. 1 at relative positions from each other.

In the depicted embodiment, the platform 140 is mounted for rotation about its rotational axis Z-Z via at least one bearing 141. Referring to FIG. 5A, in an embodiment, the bearing 141 is a conical roller bearing. The bearing 141 may be part of a bearing assembly in other embodiments. For instance, in at least some embodiments, such as shown in FIG. 5B, the platform 140, here identified 140', may be mounted for rotation about its rotational axis Z-Z via a plurality of bearings 141'. In FIG. 5B, the plurality of bearings 141' include a thrust bearing, e.g., needle roller thrust bearing, to take up axial loads and a ball bearing to take up the radial loads applied to the platform 140. The bearings 141' are concentric one to another, in this example. The bearings 141' have their respective middle planes coinciding in a thickness direction (along Z-Z).

The bearing(s) 141, 141' is/are located between the load contacting surface (or top surface 140T of the platform 140), and the plane PPA. The bearing 141, 141' are located above the plane PPA and/or below the plane PPT. This may provide more compactness (in the height direction) of the dolly 100. The bearing 141,141' could be aligned (at least partially) with the plane PPA in other embodiments. For compactness of the dolly 100, in at least some embodiments the bearings 141,141' are recessed at least partially into the frame 110'. In FIG. 5B, the bearings 141,141' are received in a bearing seat 110S defined by the frame 110, here identified 110'. The bearing seat 110S may be defined in a recessed portion of the frame 110, as shown. Such recess portion may be formed by material removal techniques, for example. Other bearing and bearing configuration may be contemplated in other embodiments to take up axial and radial loads, such as a ball joint type bearing, for example. Returning to FIG. 5A, the bearing 141 supports the platform 140 on the frame 110. In the depicted embodiment, the bearing 141 is enclosed at least partially within the cover 110C. For even greater compactness of the dolly 100 in a heightwise direction, at least part of the platform 140 may be recessed within the frame 110' and/or the cover 110C (if present).

In FIG. 5A, the bearing 141 interfaces the platform 140 and the beams 111A, 111B (discussed above) of the frame 110. The beams 111A, 111B provide support for the platform 140 and bearing 141 and transfer the load supported by the platform to a remainder of the frame 110. In embodiments where at least the bearings 141' are recessed within the frame 110', such as shown in FIG. 5B, material continuity of the frame 110' underneath the bearings 141' may be desirable to avoid/limit stress concentrations in such area. As such, the bearing seat may be integral with the frame 110' in some cases.

Angular position of the platform 140 about its rotational axis Z-Z (or vice versa) relative to a remainder of the dolly 100 (or vice versa) may be monitored. Such angular position may be computed. In the depicted embodiment, the angular position of the platform 140 relative to the dolly 100 is monitored and computed to deduct the relative orientation of the plurality of dollies 100 during movement in unison to displace the loaded object. Angular position of the platform 140 may be monitored/computed in various ways. The platform 140 includes an angular encoder 142. The angular encoder 142 may provide an angular position of the platform 140 relative to the frame 110. When the carried load is supported by the platform 140, the platform 140 and the carried load may be fixed relative to each other (e.g., mechanically connected, or by friction engagement). Monitoring the angular position of the platform 140 relative to the frame 110 may provide information as to the relative orientation of the carried load and the dolly 100 during movement of the dolly 100. Such angular position may be monitored by the controller unit 200. The angular position may be part of a control loop of the controller unit 200 in some embodiments. Such control loop may provide signal correction to the power input signals transmitted to the actuator unit 150, for example, to adjust and/or maintain a trajectory of the dolly 100 in motion.

The angular encoder 140 interfaces with the frame 110. The angular encoder 142 is of the Hall effect sensor type, though other types of encoder may be contemplated, such as optical encoders (e.g. optical incremental sensor/coder). The Hall effect sensor detects an orientation of a magnetic field (or variation thereof) as the platform 140 rotates relative to the frame 110. This may allow a continuous reading of the angular position of the platform 140 relative to the frame 110. In an embodiment, the Hall effect sensor includes a permanent magnet secured to the platform 140 and movable with the platform 140 as it rotates about the axis Z-Z. As the permanent magnet moves, the orientation of its magnetic field changes, whereby angular position of the platform 140 relative to the frame 110 may be obtained.

Referring to FIGS. 6A-6D, the dollies 100 include a positioning unit for producing and/or receiving signals indicative of a position and/or orientation of the dollies 100 relative to other dollies 100. The positioning unit of the dollies 100 may be referred to as parts of a position controller network defined at least by the dolly system 10. In the depicted embodiment, the positioning unit includes a plurality of ultrasonic emitters and sensors (UES). Such UES 180 are configured to allow detection of a relative distance and orientation (angular position) of the dollies 100 relative to each other. The UES 180 are configured to transmit and receive ultrasonic signals from other such UES 180 mounted on the other dollies 100 of the system 10. The UES 180 may be bidirectional transmitter/receiver components embedded into a single unit (single electronic component), or separate units (one unit to transmit and another unit to receive signals) depending on the embodiments.

The dollies 100 each include a plurality of UES 180. In the depicted embodiment, there are six of them on each dolly 100, though less or more may be contemplated in other embodiments. In the depicted embodiment, each UES 180 has a detection/emission field of 160 degrees. The UES 180 are located on the dollies 100 such as to provide a 360 degrees vision range, which may or may not include overlaps between adjacent UES 180. The detection/emission field may be different in other embodiments, for instance between 90 and 180 degrees (e.g. 120 degrees in another embodiment).

Distances and/or angular positions between the dollies 100 may be computed at an initial (pre-use) state and/or in real-time during operation of the system 10. In order to measure a distance between two UES 180 from different dollies 100, in an embodiment, a radio signal and a high frequency sound signal, which may be at 85 kHz or other frequencies (e.g. such as between 60 kHz and 120 kHz) are transmitted simultaneously from one UES 180 of one dolly 100. Sensors from the other dollies 100 that are within the emission field may receive such signals if they are in line-of-sight of the emitted signal. A first transmission/reception sequence is illustrated at FIG. 6A, where a first dolly 100 emits a signal from one emitter towards a second dolly 100 and a third dolly 100 which receive the emitted signal via two ultrasonic sensors. Another transmission/reception sequence is illustrated at FIG. 6B, where the emitted signal originates from another dolly 100 than that shown in FIG. 6A. Time between reception of the radio signal and reception of the high frequency sound is monitored. A computed time value may then be used to deduct the distance between such one emitter and each sensor that received the emitted signal. Deducting the distance between such one emitter and each sensor that received the emitted signal may also allow deduction of the distances between the platforms 140 of the dollies 100. The UES 180 are located at a fixed position on each dolly 100. The angular position of each dolly 100 relative to the others may thus be computed by triangulation.

As shown in FIGS. 6C-6D, the distances between the platforms 140 form a triangle. By controlling the movement in unison of the dollies 100, angles and dimensions of such triangle will be maintained as the dollies 100 are operated to displace the loaded object. Static friction between the dollies 100 and the carried load may also contribute to maintain the relative position between the dollies 100 during movement. Dollies 100 may be secured to the carried load, in other cases so as to fix, mechanically, the relative position between the dollies 100. For instance, mechanical connection between the dollies 100 and the carried load may be obtained by a clamping device or fixture mounted to the swivel platform 140 and secured to the carried load, or vice versa. FIG. 6C illustrates the dollies 100 positioned at different angular positions. By monitoring the angular position and the distance between the platforms 140, the dollies 100 may be controlled (e.g. by the controller unit) to adjust the relative position (angular and/or distance) of the dollies 100. For instance, the dollies 100 may move from an initial (or simply, detected) position (FIG. 6C) to an adjusted position (FIG. 6D). Other adjusted positions may be contemplated, depending on the practical application. For instance, rectangles, pentagons hexagons may be formed where the system 10 has more than three dollies 100 (e.g. 4, 5, 6 . . . ). Real-time monitoring and adjustment of the relative position and angle between the dollies 100 with the positioning unit, with or without measurement of speed at the servomotors, may allow maintaining the relative position of the dollies even if one or more of the dollies became unloaded during movement (e.g. due to uneven ground surfaces, the loaded object may loose contact with one or more of the dollies 100 during displacement).

With continued reference with the embodiment of FIGS. 6A-6D, the transmission/reception sequence may be repeated sequentially for each emitter, on each dolly 100 of the system 10. Redundancies of measurements may provide greater measuring precision and/or statistical certainty in at least some embodiments. In an embodiment, each transmission/reception sequence is delayed for ±80 milliseconds, which may attenuate sound wave rebounds between two transmission/reception sequence, thereby increasing signal-to-noise ratio for each distance measurement.

In at least some embodiments, the system 10 includes a temperature sensor 190A and a pressure sensor 190B. In an embodiment, each dolly 100 has a temperature sensor 190A and a pressure sensor 190B mounted thereon. Temperature and pressure affects the speed of sound traveling in the environment between the dollies 100. Considering such parameters when measuring the distances between the UES

180 of adjacent dollies 100 may allow data corrections and/or a more accurate measurement of the distances. Such data correction may be performed by the controller unit 200. The controller unit 200, operatively connected to the UES 180, with or without the temperature and pressure sensors 190A, 190B, may monitor and compute the relative position of the dollies 100.

The positioning unit including the UES 180 is one possibility. The positioning unit may include other devices to determine a relative position and/or orientation between dollies 100. Other signals or data could be indicative of the position (distance and/or angular) of the dollies 100, such as GPS and/or WIFI signals/data, laser imaging, detection and ranging device (lidar) and/or camera signals/data, and/or data/signals from a compass such as digital compass. For instance, in an embodiment, the positioning unit may include cameras and bar codes detectable by such cameras on the dollies 100. By image processing, a distance between the dollies 100 could be deducted, for instance by determining the size and orientation of the bar codes relative to the cameras upon image acquisition.

The dollies 100 can be controlled individually or as a group. When the dollies 100 are operated as a group to displace a loaded object, their relative movement and relative positions are monitored as described above. Speed of each dolly 100 and angle relative to a reference axis or position may be monitored and/or controlled.

The measured angles and speed may then be compared to a desired angle and speed. Such desired angle and speed may be determined by an operator of the dolly system 10 and/or programmed in the controller unit 200. When operating a plurality of dollies 100, the relative movement and position of the dollies 100 may be taken with reference to a selected one of the dollies 100. Such selected dolly 100 may be referred to as the "reference" dolly 100. If speed and angle are properly controlled, including by comparing their relative movement and position with reference to the "reference" dolly 100, the dollies 100 may move over a same distance and/or rotate at a same angle relative to their initial position, such that the dollies 100 may maintain their relative position and orientation as they move.

Figures 7A, 7B, 7C, 8A, 8B:
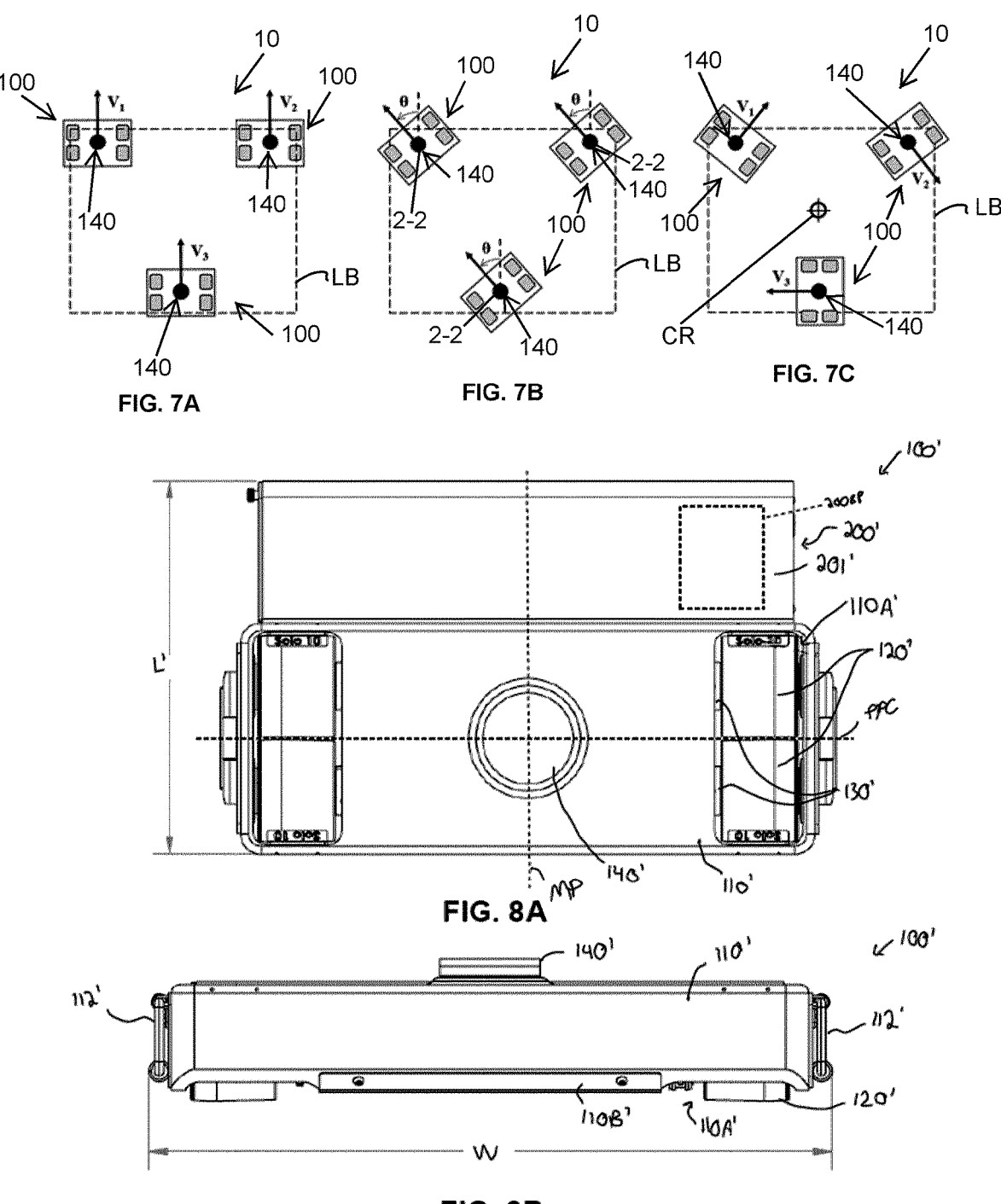
FIGS. 7A-7C are illustrations of the plurality of dollies of FIGS. 6A-6D moving in unison.
FIG. 8A is a top view of a dolly as in FIG. 1, according to an embodiment.
FIG. 8B is a front elevation view of the dolly of FIG. 8A.

Referring to FIGS. 7A to 7C, movements of three dollies 100 of the dolly system 10 are illustrated. In FIG. 7A, speed of each dolly 100 is represented by vectors V1, V2, V3. Each dolly 100 may move forward and backward, in opposite directions. In FIG. 7B, the dollies 100 are shown during a rotational motion about their center axis, which may correspond to the rotational axis Z-Z of the platform 140 in at least some embodiments. In an embodiment, the actuator unit 150 driving their respective pair of axles 130 on each side of the dollies 100 at equal speed in opposite directions would result in having the dollies 100 turning on themselves, about the rotational axis Z-Z of the platform 140. In FIG. 7C, an induced rotational movement of the loaded object (here illustrated as the dotted line box LB) by three dollies 100 is illustrated. A center of rotation CR of the load LB is located at a center point between the dollies 100. The center point may be defined as the closest point from each rotational axis (here corresponding to Z-Z) of the dollies 100, or the originating point of a turning radius of the dollies 100. In order to achieve such movement of the loaded object, the dollies 100 may all move angularly while moving forward (or backward). When moving along an arcuate path, the rotation of the rolling elements 120 that are the closest from the center of rotation CR is at lower speed than that of the other rolling elements 120 of the dollies 100.

During any of these exemplary movements illustrated in FIGS. 7A to 7C, the angle and speed of each dolly 100 may be compared and "corrected" relative to the angle and the speed of a selected one of the dollies 100 to obtain a desired trajectory for the loaded object. Misalignment between the dollies 100 overtime may result from a load differential on the dollies 100, unevenness of the ground surface experienced by each dolly 100 at an instant time, one dolly 100 crossing an expansion joint while the other dollies 100 are not, etc. A control loop implemented by the controller unit 200 may correct such misalignment of the dollies 100 as they are moving in unison. For instance, during a linear displacement as illustrated in FIG. 7A, a proportion of the load of the loaded object supported on the dollies 100 may be measured at each platform 140. If radial forces (Fx, Fy) measured at the platform 140 of the dollies 100 are compared (between the dollies 100) and such radial forces are detected as being in opposite directions at the initiation of the movement (and/or pending movement) of the dollies 100, this may indicate that the dollies 100 are not rolling in the exact same trajectory (e.g. more than ±1 degree of misalignment). As such, an angular shift may be performed to realign the trajectory of the dollies 100 relative to the reference dollies 100. Real-time adjustment ("on-the-go" adjustment) of the relative angle of the dollies 100 during motion as described may thus allow maintaining the relative position of the dollies 100 in operation. Such control loop with real-time adjustment could be implemented with or without the use of the positioning unit described above, for instance.

With reference to FIG. 8A to 8D, another exemplary dolly 100' similar to that discussed above is presented. References to the features of various embodiments of the dolly 100 described above may similarly apply to the dolly 100' and will not be integrally repeated herein for conciseness. In the depicted embodiment, the dolly 100' includes a frame 110' made as an integral piece, i.e., a single block piece. A single block frame 110' may optimize the payload per kilogram of the dolly 100' in at least some embodiments. One continuous piece of material may reduce the stresses and strains concentrations within the frame 110', which may in turn increase its loading capacity and/or compactness. For instance, in an embodiment, the dolly 100' with the single block frame 110' may have a payload per kilogram of about 0.15±0.05 tons per kilogram. It may be more in other embodiments, such as between 0.3 and 0.4 tons per kilogram. Such single block of material may be machined (e.g., material removal manufacturing techniques), made from additive manufacturing techniques, forging, etc., so as to define one or more beams, such as the beams 111A, 111B described above with respect to other embodiments. The single block may be aluminium in an embodiment. Other material may be contemplated, e.g., titanium, steel, etc.

As shown, the frame 110' includes a beam 111', which extends in this case, transversely with respect to the length L' of the dolly 100' or front-rear orientation of the dolly 100'. In the depicted embodiment, the beam 111' is centrally located within the frame 110'. The beam 111' extends in a plane PPC (FIGS. 8A and 8D), which is transverse to the meridional plane MP. The plane PPC intersects with the platform 140'. Location of the beam 111' under the platform 140' as shown may allow the frame 110' to support a greater load compared to frame architecture not reinforced by such beam 111' (or other rigidifying structure) under the platform 140'.

The force sensing arrangement in the different forms discussed above with respect to other embodiments, including the instrumented beam features, to deduct and/or measure the load applied to the swivel platform 140, here identified 140', may apply to the beam 111'. Those aspects are not described again for conciseness but should be understood to apply to the dolly 100' discussed herein. For example, one or more strain gauges Rx' are identified on FIG. 8D as a reference to that discussed above.

The frame 110' defines the internal skeleton of the dolly 100' as well as an outer shell thereof, at least on a top of the dolly 100'. Hollowed portions of the frame 110' may receive motive and/or electronic components of the dolly 100' mounted on the frame 110'. As shown, the frame 110' includes cut-outs 110A' for receiving the rolling elements 120' mounted on axles 130' supported by the frame 110'. Other cut-outs 110A' of the frame 110' may receive additional components, such as the actuator units 150', including motor 151', torque transmitter 152', 155', gears 155A' 155B', chain 155C', etc., similar to that already described above, as can be seen in FIG. 8D. The cut-outs 110A' may be referred to as hollowed portions defined in the frame 110A', which may be obtained by material removal manufacturing techniques.

In the depicted embodiment, each motor 151' is received in a respective cut-out 110A'. The cut-outs 110A' are located on opposite sides of the beam 111'. In other words, the beam 111' defines a wall between the cut-outs 110A' receiving the motors 151'. In some embodiments, such as shown, the motors 151' are mounted to the frame in a cantilevered fashion. The motors 151' and the torque transmitter 152' are mounted axially relative to each other. The torque transmitter 152' is mounted to the frame 110'. Fasteners may be used to couple the torque transmitter 152' to the frame 110', though other features, such as interlocking features, may be contemplated. The motors 151', and torque transmitters 152', 155' are mounted serially relative to each other. For compactness, the motors 151', and torque transmitters 152', 155' are aligned along a common axis with the rotational axes of rolling elements 120' on opposite sides of the dolly 100'. As shown, in at least some embodiments, the axles 130' of the respective rolling elements 120' opposing each other on each side of the meridional plane MP of the dolly 100' are coaxial with a rotational axis 151R' of the motors 151'. This may allow fitting the power components of the dolly 100' in a limited space within the frame 100', which in turn may increase compactness of the dolly 100'. Other placement may be contemplated, for instance where motors 151', and torque transmitters 152',155' are disposed angularly with respect to each other, amongst other things.

Aspects described above similarly applies in the dolly 100' and will not be described again for conciseness. A protection plate 1101B', or skid plate, may be coupled, e.g., removably, to the frame 110' to cover those cut outs 110A' underneath the dolly 100' for protection against impact with object and/or protuberances on the ground, and/or external contaminants, such as water, oils, or other fluids, or other contaminants for instance, and provide access to internal components of the dolly 100', for maintenance, replacement, for instance.

Figure 8C:
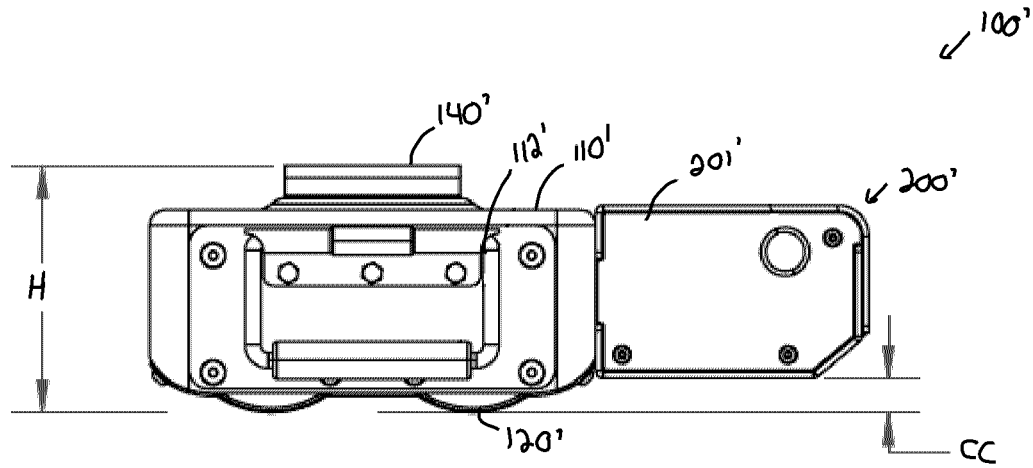
FIG. 8C is a side elevation view of the dolly of FIG. 8A.
Figure 8D:
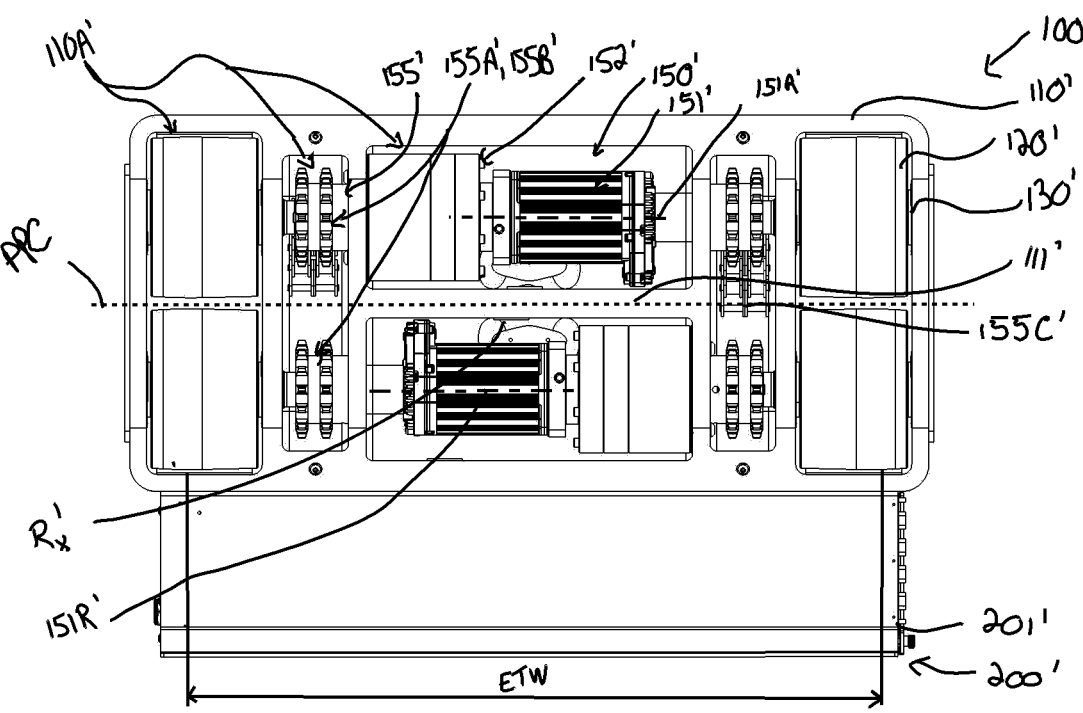
FIG. 8D is a bottom view of the dolly of FIG. 8A.
Figure 9A:
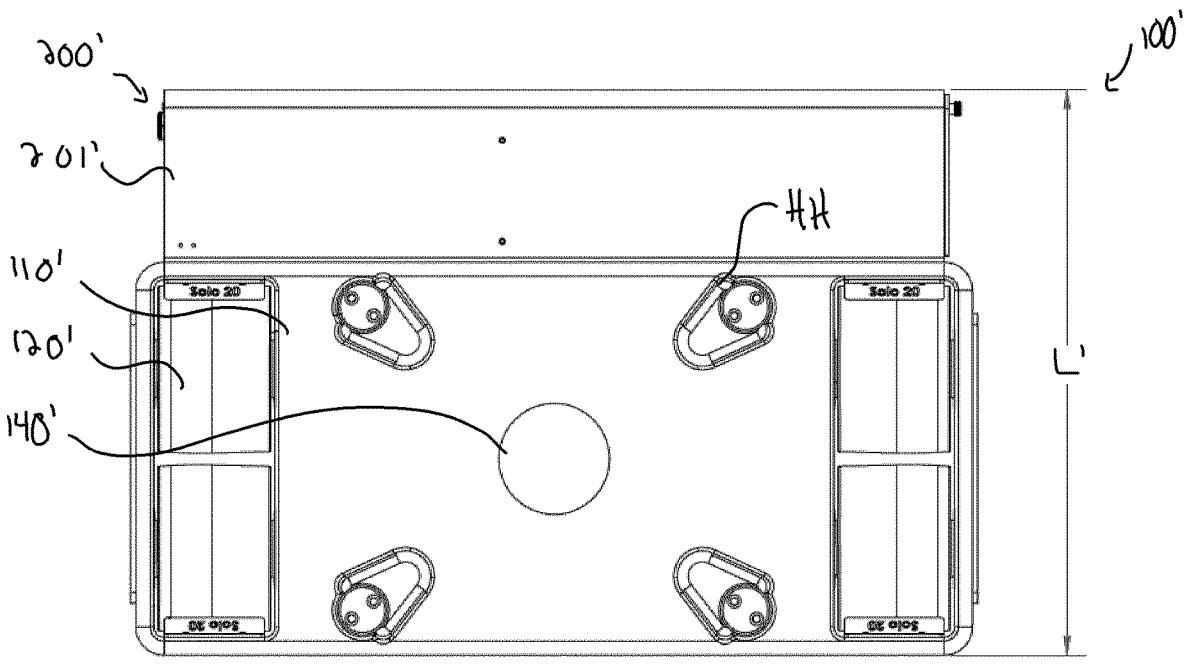
FIG. 9A is a top view of a variant of the dolly of FIG. 8A.
Figure 9B:
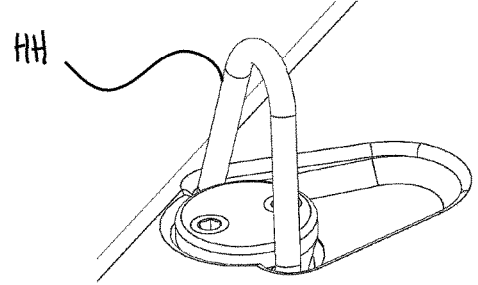
FIG. 9B is a magnified perspective view of a feature shown in FIG. 9A.
Figure 9C:
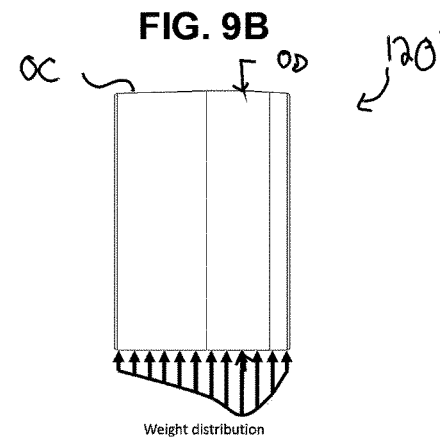
FIG. 9C is a front elevation view of a rolling element of the dolly of FIGS. 8A-8D and 9A.

An individual rolling element 120' of FIGS. 8A to 8D is shown at FIG. 9C. The rolling elements 120' or wheel is generally cylindrical. As shown, the wheel is smooth, i.e. without tread pattern. The wheel has an asymmetrical profile. As shown, an outer diameter OD and circumference OC of the wheel varies in a widthwise dimension of the wheel. The outer diameter OD and circumference OC of the wheel is larger towards one side of the wheel. The larger outer diameter OD and circumference OC are axially offset from a centerline of the wheel. Such wheel is deformable, those larger outer diameter OD and circumference OC are taken in an undeformed state (unloaded wheels). Upon application of the load on the dolly 100' including such wheels, a weight distribution on the wheel may be uneven as a result of such uneven outer diameter OD and circumference OC. The weight distribution of the wheel may be axially offset from the centerline of the wheel, and moved further away from the swivel platform 140' compared to even wheel, for a given dimension of the dolly 100'. In other words, such asymmetric wheel profile may maximize an effective track width ETW for a given dolly 100, which may contribute to minimizing the rotational resistance of the dolly 100 on the ground surface. The effective track width ETW may refer to the distance between the peak outer diameter OD and circumference OC of wheels on opposite sides of the dolly 110', as identified in FIG. 8D. The ratio WB/WT discussed above may also apply with ETW, where the ratio is expressed by WB/ETW.

Returning to FIGS. 8A to 8C, the dolly 100' includes handles 112' to facilitate handling and transportation by hand. The handles 112' are disposed on opposite sides of the dolly 100'. The handles 112' may be fold-down or hinged handles or fixed handles, for examples. Such handles may be absent.

Also shown is the controller unit 200' enclosed in a casing 201'. In the depicted embodiment, the casing 201', so is the controller unit 200', is coupled to the frame 110'. In some cases, the casing 201' is removably coupled to the frame 110'. This may facilitate replacement and/or modularity of the controller unit 200' relative to a remainder of the dolly 100'. The casing 201' may not be removable in other cases. The casing 201' may also enclose a battery or battery pack 200BP, which may be part of the controller unit 200'. The battery pack may be replaceable in at least some embodiments. For instance, in an embodiment, the battery pack includes a plurality of battery cells, e.g., lithium-ion cells, lithium iron phosphate cells. The battery pack 200BP could have other types of battery in other cases, e.g. lead-acid battery. As seen in FIG. 8C, the casing 201' is not enclosed within the frame 110'. In other words, the casing 201' is located outward of the frame 110', on a side thereof. The overall dimensions (or footprint) of the frame 110' are therefore a fraction of the overall dimensions of the dolly 100'. The casing 201' does not support the carried load, hence it may not be as rigid as the frame 110'. Such arrangement may also limit weight of the dolly 100' as a whole. A proportion of the length L' of the dolly 100' occupied by the frame 100' may be 50%±10% in some cases. Such proportion may be larger, in embodiments where the size of the casing 201' may be reduced relative to a remainder of the dolly 100', for instance.

The casing 201' is coupled to the frame 110' in a cantilevered fashion. The casing 201' may be coupled by fasteners, brackets, hooks, interlocking features, or other couplings. A clearance gap CC is defined between the casing 201' and the ground. The clearance gap CC is greater than that between the frame 110' and the ground. Such larger clearance gap CC underneath the casing 201' may facilitate movement of the dolly 100' on non horizontal surfaces, such as when a dolly 100' initiates a ramp climbing, for instance. The ground clearance under the frame 110' may still be at a minimum to limit the maximal height H of the dolly 100', without (or without substantially) compromising the capacity of the dolly 100' to adapt to uneven ground surfaces.

FIG. 9A illustrates features of a variant of the dollies 100, 100' described above. FIG. 9B is a magnified view of one such features. As shown, in some embodiments, the dolly may have hoisting eyes HH (one or more), which may facilitate handling, for instance depending on the size and/or weight of the dolly 100'. The hoisting eyes HH may be foldable, as shown, recessed within the outer shell of the dolly 100' defined by the frame 110', as some possibilities.

The dollies (100, 100') discussed above may be operated as part of the dolly system 10 or operated individually to transport a load.

Referring to FIGS. 10A and 10B, a load skate 300 for use with the dollies 100, 100' to transport a load may be provided. The load skate 300 may be part of a kit including one or more dollies 100, 100'. There may be a plurality of such load skate 300 as part of the kit. The load skate 300 may have different sizes and/or load capacities depending on the embodiments. The load skate 300 is not motorized as are the dollies 100, 100'. The load skate 300 may be referred to as a passive or trailing support. The load skate 300 may provide additional support points on the ground for transporting large loads. When transporting a load, the one or more dollies 100, 100' may provide the motive power to transport the load and the load skate 300 may be trailed by the one or more dollies 100, 100' by its engagement with the carried load.

In the depicted embodiment, the load skate 300 includes a plurality of rolling elements 301, which may be similar or same as the rolling elements 120, 120' discussed above. The rolling elements 301 are mounted in a tandem configuration on a frame 302. As shown, the load skate 300 includes a pair of frames 302 coupled to each other by a tube 303. The tube 303 is movably coupled to the frames 302. A distance between the frames 302 may be adjusted by moving the frames 302 relative to each other along the tube 302. A locking device 304, which may include a clamp, a screw or else may block the relative movement between a frame 302 and the tube 303. By adjusting the relative distance between the frames 302, a track width of the load skate 300 may be adapted to various carried loads and provide stability during transportation. The tube 303 may also maintain alignment of the frames 302 forming part of the load skate 300, The tube 303 may maintain a relative orientation of the frames 302 during displacement. Each frame 302 includes a pair of axles 301A on which are mounted the rolling elements 301. The pair of axles 301A may be movable one with respect to the other about the tube 303, in some embodiments. Each frame 302 defines a tube engaging portion 302A, which may slidably engage with the tube 303. The tube engaging portion 302A, so is the tube 303, may be centrally aligned between the pair of axles 301A in some embodiments. This can be seen in FIG. 10A. The frames 302 may include handles 304 to facilitate handling of the load skate 300. Deformable pads 305, such as rubber pads may be mounted atop each frame 302 so as to interface with the carried load. This may improve friction and stability between the load skate 300 and the carried load, in at least some embodiments. The overall height of the load skate, i.e. from ground to top, may be the same as that of the one or more dollies 100, 100' which may be used therewith as a system.

Referring to FIG. 11, another exemplary dolly system 10' may include at least one of the dollies 100, 100' and at least one of the load skate 300 described above. The dolly system 10' may include a platform 400, supported by at least one of the dollies 100, 100' and at least one of the load skate 300. The platform 400 may be secured/fixed to the at least one of the dollies 100, 100' and the at least one of the load skate 300, or only in friction engagement with the swivel platform 140, 140' (not shown) and frames 302 (or pads 305) (not shown) of the load skate 300. The carried load may be put on the platform 400. The platform may interface with the at least one of the dollies 100, 100', the at least one of the load skate 300 and the carried load. The dolly system 10' may form part of a kit including one or more of the items described above.

Referring to FIG. 12, such kit may include a carrying case 500. Such case 500 may facilitate carrying the dolly systems 10, 10' from one site to another, for instance. The carrying case 500 may be adapted to receive at least one or more dollies 100' without any lifting. For instance, in the depicted embodiment, the carrying case 500 includes a ramp 501. The ramp 501 is defined by a foldable side panel of the carrying case 500. The one or more dollies 100, 100' may be rolled into the carrying case 500 from the ground, onto the ramp 501. This is only an example of the carrying case 500.

Figures 13, 14A:
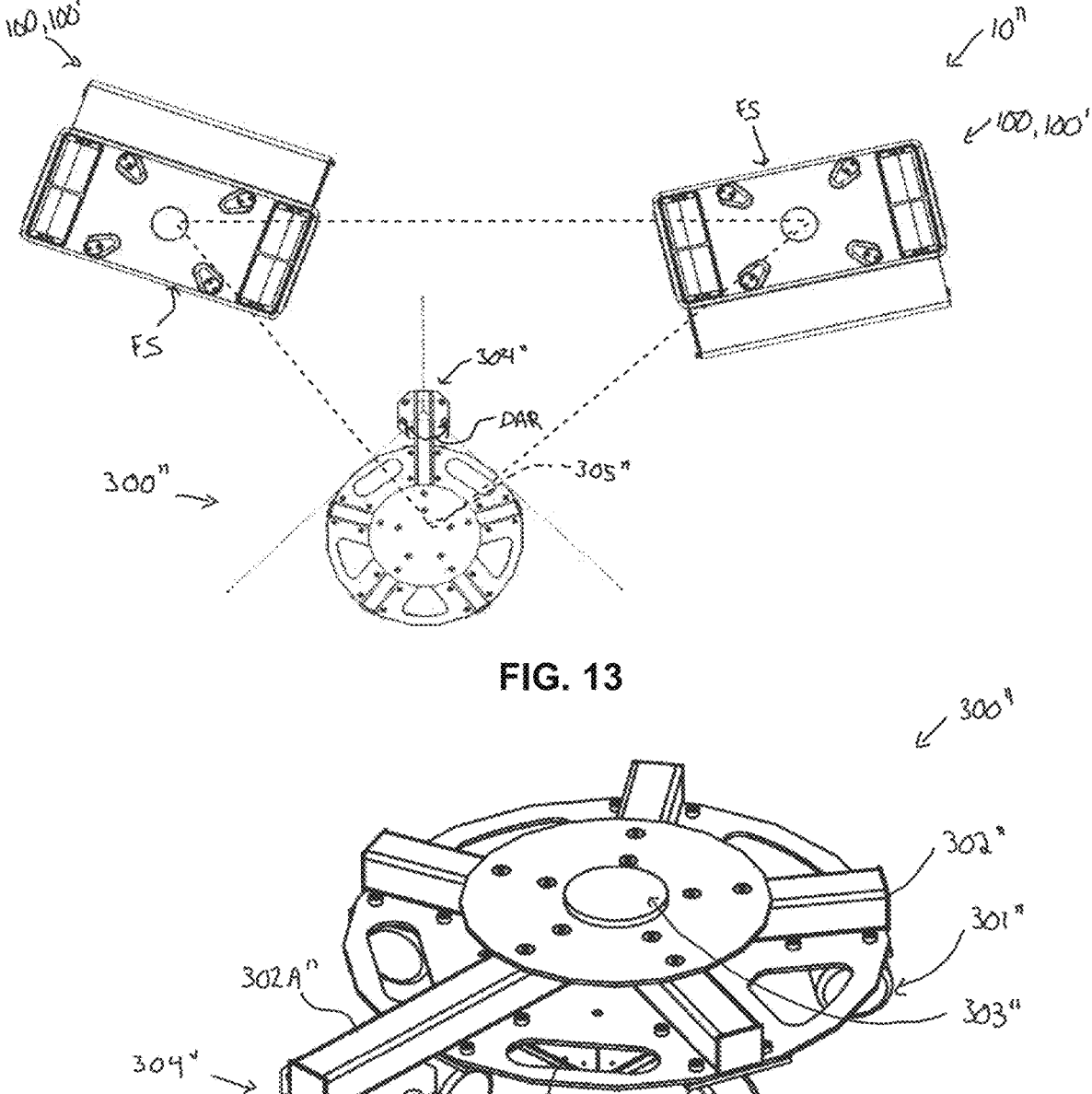
FIG. 13 is a top view of a dolly system according to another embodiment.
FIG. 14A is a perspective view of a load skate of the dolly system of FIG. 13.

Referring to FIG. 13, another embodiment of the dolly system 10" includes a plurality of dollies 100, 100' and at least one load skate 300", which may be referred to as a rotational skate. In the depicted embodiment, the exemplary dolly 100' is shown, though the system 10" may apply to dolly 100 presented herein. In FIG. 13, two dollies 100, 100' are illustrated, but there could be more. The load skate 300" is a single load skate 300", though the system 10" may include one or more other load skates such as those discussed above.

Respective components of the dolly system 10" define a position controller network. The dollies 100, 100' and the load skate 300" have respective features, which communicate and/or cooperate to monitor and control a relative position and/or orientation of the dollies 100, 100' and load skate 300" to control a displacement of the load.

Figure 14B:
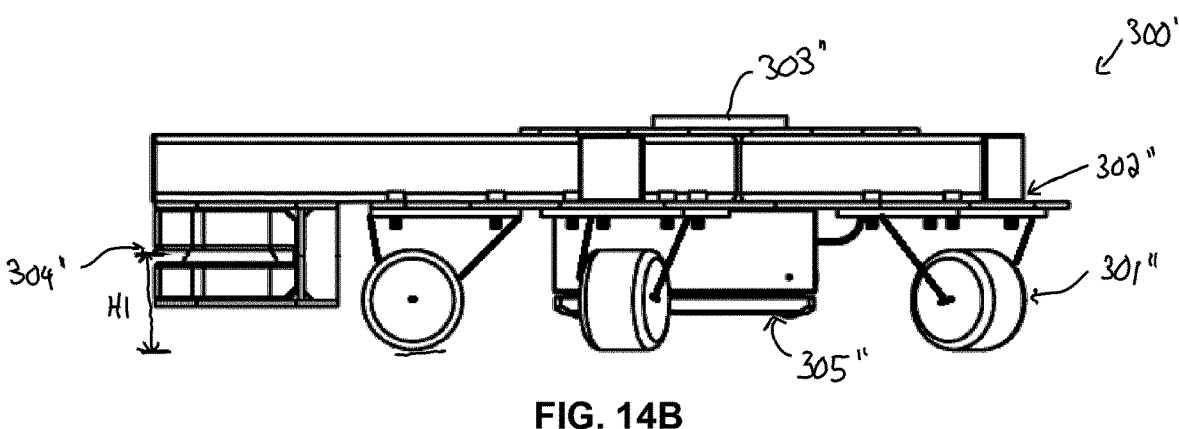
FIG. 14B is a side elevation view of the load skate of FIG. 14A.

FIGS. 14A and 14B illustrate the load skate 300". As shown, the load skate 300" includes rolling elements 301", which may be similar to the rolling elements 120, 120' described above. The rolling elements 301" are mounted to a frame 302" of the load skate 300". The rolling elements 301" are mounted to the frame 302" in a swivel fashion to allow omnidirectional movement of the load skate 300" on the ground. The frame 301" includes a platform 303" for receiving the carried load. As shown, the platform 303" protrudes upwardly from a remainder of the load skate 300". In the depicted embodiment, the platform 303" is located centrally with respect to the rolling elements 301" on the frame 301". The rolling elements 301" are distributed about the platform 303". Force applied by the carried load on the platform 303" may be distributed evenly on the rolling elements 301 ", depending on the position of the respective rolling elements 301" relative to the platform 303".

The load skate 300" includes a lidar 304" and an on-board computer 305" operatively connected to the lidar 304" to receive signals and/or data therefrom. The on-board computer 305" may be any appropriate type of controller or processor. The computer 305" is a processing unit which may be used with a non-transitory computer-readable memory communicatively coupled to the processing unit and comprising computer-readable program instructions executable by the processing unit for performing ranging options as described herein.

The lidar 304" may generate, transmit and/or receive signals/data indicative of a position and/or orientation of the dollies 100, 100' of the system 10", under the carried load (whether or not the carried load is present). The lidar 304" performs repetitive range measurements between the lidar 304" and surrounding objects of its environment. In the depicted embodiment, the lidar 304" scans rotationally its environment to obtain signals/data indicative of the position and/or orientation of the dollies 100, 100'. Such scanning may be performed while the dollies 100, 100' and the load skate 300" are static. This may reduce the error margin in the measurement of the relative position between the dollies 100, 100'. Other aspects related to the scanning are described later. The lidar 304" is mounted at a distance from a center of the load skate 300", though it could be centered as well. As shown, the lidar 304" is mounted on a frame member 302A" which extends outwardly from a remainder of the load skate 300", this being an option among others. The lidar 304" may be viewed as mounted on a side of the frame 302", laterally outwardly relative to the position of the rolling elements 301" on the frame 302". The lidar 304" may not scan over a full circumference thereof, though it is contemplated to have a series of lidar 304", e.g., two or more, to increase a peripheral ranging. The rolling elements 301" and other components of the load skate 300" are in the line of sight of the Lidar 304" over a fraction of the full circumference, which may define a dead angle DAR (FIG. 13) of the lidar 304". The effective line of sight (i.e., line of sight minus the dead angle DAR) of the lidar 304" covers at least 270 degrees±20 degrees of circumference. For instance, in an embodiment, the dead angle range DAR is 90 degrees±20 degrees. In other embodiments, the dead angle DAR may be smaller. The dead angle range DAR may depend on the geometry of the load skate 300" and/or the offset distance of the lidar 304" with respect to the center of the load skate 300"/frame 302". For instance, the lidar 304" may be located at a greater distance from the center of the load skate 300" so as to reduce the dead angle range DAR. Such design may be less compact and/or more cumbersome.

During the scanning, the lidar 304" may measure successively a large number of objects distances in its revolution. A point cloud including those measurements may be represented into a two-dimensional plane as an outline map of the surrounding environment. The point cloud may define a signal output of the lidar 304" to the on-board computer 305", to convey both spatial and distance information for each distance measurement, but the lidar 304" may also be an integrated solution doing point cloud processing to output object position and orientation. It may be desirable to scan the environment close to the ground. As such, even if the dollies 100, 100' and the load skate 300" are on an uneven (not perfectly flat) surface, the scanning of the lidar 304" may capture measurement points on one or more surfaces of the dollies 100, 100' to detect and identify them. As shown, in at least some embodiments, the lidar 304" has a scanning plane located at a mid-height H1 of the load skate 300". The mid-height of the load skate 300" may correspond to an elevation of 70 mm±30 mm from the ground or rolling elements 301" contact point on the ground (e.g., measured orthogonally with respect to a flat surface) in at least some embodiments.

With continued reference to FIG. 13, the dollies 100, 100' define at least one flat surface FS on a side thereof, or other known and recognizable geometric feature. Such flat surface FS may be of a predetermined dimension and serve as a reference surface for the dolly detection by the lidar 304". During scanning, the scanning plane (or projection thereof) of the lidar 304" may intersect with the flat surfaces of the dollies 100, 100'. This may result in a dotted line in the point cloud, or other known shape depending on the surface. Detection of such dotted line for each dolly 100, 100' may be indicative of the presence of the dolly 100, 100'. By computing the spatial and distance information from each distance measurement associated with the measurement points of the dotted line, a position and orientation of each dolly 100, 100' may be determined relative to a reference point, which may be the center of the load skate 300", the center of the platform 303" of the load skate 300", or the lidar 304", for example. By repeated measurements, either static measurements or measurements in displacement taking into consideration movements if not negligible, and a control loop, triangulation calculation may be effected between the dollies 100, 100' and the load skate 300". Other reference surfaces may be contemplated. In an embodiment, a surface of the dollies 100, 100' may include encoding or visual patterns, which may be recognized/decoded by the lidar 304" and/or the on-board computer 305" as an indication of the presence, including position and orientation, of each dolly 100, 100'. The lidar 304" and/or computer 305" may for example be calibrated with geometrical data including a position and orientation of the reference surface, encoding and/or visual patterns to calculate the position and orientation of the dollies 100, 100' once the position and orientation of the reference surface, encoding and/or visual patterns is determined. For instance, the reference surface of each dolly 100, 100' may include an embossed pattern, e.g., bumps and recesses, or other characteristic features part of each dolly 100, 100'. to be detected by the lidar 304" and/or the on-board computer 305" during scanning. While in some embodiments there may be only one reference surface per dolly 100, 100', there may be more than one reference surface per dolly, e.g., each side of the dolly 100, 100', or a surface extending along a majority of a periphery of the dolly 100, 100', in other embodiments. The lidar 304" may scan a single line (one pixel line), or a plurality of lines, depending on the embodiments. For instance, in an embodiment, the lidar 304" may be a 3-D scanner which may produce a point cloud in a spherical coordinate system (or other 3-D system) instead of or in addition to in a polar coordinate system (or other 2-D system).

The on-board computer 305" includes a communication interface (one or more) to interact with an operator and/or dollies 100, 100'. The lidar 304" and the on-board computer 305" may be a single device in some embodiments. The on-board computer 305" may receive, compute, and generate control signals from/to an operator and the dollies 100, 100' of the system 10". The on-board computer 305" may be accessed wirelessly by the operator, via a personal computer, for instance, or external controller, such as portable devices. In an embodiment, the on-board computer 305" may communicate wirelessly (e.g., WiFi, RF signals) with the dollies 100, 100'. Wired connections are also possible. A control loop may be implemented between the on-board computer 305" and the controller unit 200, 200' part of the dollies 100, 100'. In at least some embodiments, the on-board computer 305" may emit/receive output/input signals to/from the dollies 100, 100', to command the dollies 100, 100' and receive status information, such as an orientation, speed, etc., therefrom. The command signals may be sent by the operator via the external controller in addition to or instead of the on-board computer 305" of the load skate 300" in some cases.

With reference to the above, an exemplary protocol of detection and positioning of the dollies 100, 100' in the system 10" is as follows: a detection of the position and orientation of each dolly 100, 100' relative to the load skate 300" is initialized. The dollies 100, 100' individually, sequentially or simultaneously, move for identification by the load skate 300" and reorient themselves relative to the load skate 300". A computation of the spatial and distance information obtained by the load skate 300" for each dolly 100, 100' is performed. A position and orientation between the dollies 100, 100' and the load skate 300" is computed by triangulation. The dollies 100, 100' may rotate to each align their reference surface relative to the load skate 300". An initial reference position of the dollies 100, 100' and the load skate 300" may be set. Information relative to the initial reference position may be stored, in the on-board computer 305" and/or controller unit 200, 200' parts of the dollies 100, 100'. By control loop, as discussed above, the triangulation calculation between the dollies 100, 100' and the load skate 300" may be maintained as they move in unison to transport the load. In embodiments of the dollies 100, 100' where the angular encoder 142 is present, an initial angular position may be set and stored, similarly. The above parameters may then be part of the control loop during operation of the dolly system 10".

Figure 15:
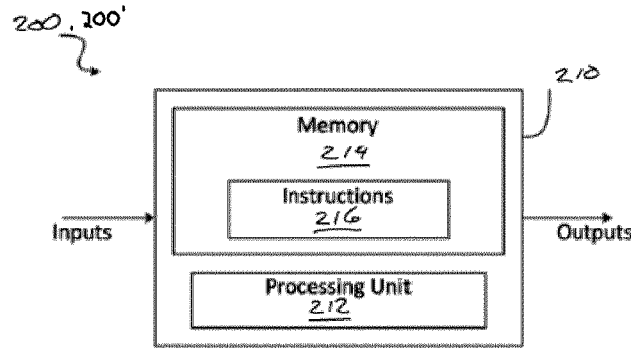
FIG. 15 is a schematic illustration of an exemplary controller unit for operating the system of FIG. 1, according to an embodiment.

With reference to FIG. 15, the operation of the dolly system 10, 10" may be implemented by a computing device 210, as an embodiment of the controller unit 200, 200'. The computing device 210 comprises a processing unit 212 and a memory 214 which has stored therein computer-executable instructions 216. The processing unit 212 may comprise any suitable devices configured to implement the functionality of the controller unit 200, 200' such that instructions 216, when executed by the computing device 210 or other programmable apparatus, may cause the functions/acts/steps performed by the controller unit 200, 200' as part of the operation of the dolly(ies) as described herein to be executed. The processing unit 212 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 214 may comprise any suitable known or other machine-readable storage medium. The memory 214 may comprise non-transitory computer readable storage medium, for example, but not limited to, an electronic, magnetic, optical, electromagnetic, infrared, or semiconductor system, apparatus, or device, or any suitable combination of the foregoing. The memory 214 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 214 may comprise any storage means (e.g., devices) suitable for retrievably storing machine-readable instructions 216 executable by processing unit 212.

The controls of the dollies, computing, and/or monitoring described herein may be implemented in a high level procedural or object oriented programming or scripting language, or a combination thereof, to communicate with or assist in the operation of a computer system, for example the computing device 210. Alternatively, the controls, computing, and/or monitoring described herein may be implemented in assembly or machine language. The language may be a compiled or interpreted language. Program code for implementing the controls, computing and/or monitoring may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the controls, computing, and/or monitoring described herein may also be considered to be implemented by way of a non-transitory computer-readable storage medium having a computer program stored thereon. The computer program may comprise computer-readable instructions which cause a computer, or more specifically the processing unit 212 of the computing device 210, to operate in a specific and pre-defined manner to perform the controls, computing, and/or monitoring described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired.

Although references to the controller unit 200, 200' are made in the above description with reference to FIG. 15, the above description also applies to the on-board computer 305" discussed herein.

Referring to FIG. 16, an exemplary external controller 600 is shown. The external controller 600 may be a handheld controller for instance. In at least some embodiments, the external controller 600 may allow wireless connection to the controller unit 200, 200' features on the dolly(ies) 100, 100' and/or on-board computer 305" when present. Wired connection may also be contemplated. The external controller 600 includes a user interface 601. The user interface 601 may include touchscreens, actuators, joysticks, pressure buttons, potentiometers, or other controls. In the depicted embodiment, the user interface 601 includes actuators 602A, 602B for manual control of the lateral and forward-backward motion of the dolly(ies) 100, 100' controlled therewith. A screen 603 may provide information on the status of the dolly(ies) 100, 100', such as battery level, connectivity, etc. Speed of the dolly(ies) may be adjusted, in a discrete, e.g., low/high speed, or gradated fashion by the same actuators or additional actuators 604. One or more of power switches 605 and emergency stop 606 switch may be present on the external controller 600, such as shown. A horn or audible signal button may be present, as another possibility. The user interface 601 may include displacement modes selection of the dolly(ies) 100, 100'. While the external controller 600 is illustrated as an industrial controller, other types of external controller 600 may be contemplated, such as smart phones, tablets, or other portable electronic devices allowing wireless (or wired) connection to a communication network.

The invention claimed is:

1. A dolly for transporting a load on a ground surface, the dolly comprising:

a frame;

a plurality of rolling elements mounted on the frame for rotation about respective rotational axes, the plurality of rolling elements defining a contact footprint of the dolly on the ground surface;

a swivel platform defining a load contacting surface at a top of the dolly, the swivel platform extending at an elevation above the frame, the swivel platform mounted on the frame for rotation about a platform axis, the platform axis located within the contact footprint;

an actuator unit including a first motor and a second motor, the first motor and the second motor drivingly engaged respectively to at least two rolling elements of the plurality of rolling elements, the at least two rolling elements drivingly engaged respectively to the first motor and the second motor disposed on opposite sides of a meridional plane of the swivel dolly; and an on-board controller unit operatively connected to the actuator unit, the on-board controller unit operable to actuate the actuator unit;

wherein the frame defines a beam, the swivel platform is located over the beam, the first motor and the second motor are disposed on opposite sides of the beam.

2. The dolly as defined in claim 1, wherein the first motor and the second motor are at least partially recessed within the frame, a first torque transmitter axially mounted to the first motor and a second torque transmitter axially mounted to the second motor, the first torque transmitter and the second torque transmitter each coupled to the frame.

3. The dolly as defined in claim 1, wherein the frame is a single block frame, the single block frame defining a first cut-out and a second cut-out located at least partially under the swivel platform, the beam extending in a transverse plane intersecting with the swivel platform, the beam defining a common wall between the first cut-out and the second cut-out the single block frame further defining other cut-outs receiving the rolling elements.

4. The dolly as defined in claim 1, wherein the plurality of rolling elements have a wheelbase defined between adjacent ones of the plurality of rolling elements on a same side of a meridional plane of the dolly, and a track width defined between respective contact points of opposite ones of the plurality of rolling elements on opposite sides of the meridional plane, a ratio of the wheelbase over the track width is $0.25\pm0.1$.

5. The dolly as defined in claim 4, wherein the dolly has a width transverse to a meridional plane of the dolly, a ratio of the track width over the width is $0.9\pm0.09$, and wherein the dolly has a length L along the meridional plane, wherein the wheelbase is smaller than $0.3L\pm0.1L$.

6. The dolly as defined in claim 1, wherein the load contacting surface of the swivel platform extends in a plane PPB above a tangential plane PPT passing by a top of the respective ones of the plurality of rolling elements, wherein an offset between the plane PPB and the tangential plane PPT is between 5% and 25% of a height of the dolly defined between the load contacting surface of the dolly and the ground surface.

7. The dolly as defined in claim 1, wherein the dolly includes a force sensor coupled to the frame, the force sensor connected to the on-board controller unit to transmit signals indicative of a load applied on the swivel platform.

8. The dolly as defined in claim 7, wherein the force sensor includes at least one strain gauge coupled to the frame, the strain gauge part of a Wheatstone bridge circuit.

9. The dolly as defined in claim 1, wherein the swivel platform includes an angular encoder, the angular encoder transmitting a signal indicative of an angular position of the swivel platform relative to the frame, about the platform axis.

10. The dolly as defined in claim 1, wherein the actuator unit includes a motor and a torque transmitter drivingly engaged to a respective one of the at least two rolling elements.

11. The dolly as defined in claim 1, wherein the dolly includes at least two pairs of axles supporting respective ones of the plurality of rolling elements, the at least two pairs of axles disposed on opposite sides of a meridional plane of the dolly, the at least two pairs of axles each including one of the at least two rolling elements drivingly engaged to the actuator unit, the axles of each one of the at least two pairs of axles are drivingly engaged by a torque transmitter.

12. The dolly as defined in claim 1, wherein the dolly includes a casing enclosing the on-board controller unit, the casing projecting outwardly from an outer periphery of the frame the casing is coupled to the frame in a cantilevered fashion, a clearance gap is defined between the casing and the ground surface, the clearance gap greater than that between the frame and the ground surface.

13. A dolly for transporting a load on a ground surface, the dolly comprising:

a frame;

a plurality of rolling elements mounted on the frame for rotation about respective rotational axes, the plurality of rolling elements defining a contact footprint of the dolly on the ground surface;

a swivel platform defining a load contacting surface, the swivel platform extending at an elevation above the frame, the swivel platform mounted on the frame for rotation about a platform axis, the platform axis located within the contact footprint;

an actuator unit configured to displace the dolly on the ground surface, the actuator unit including a first motor and a second motor, the first motor drivingly engaged to at least a first one of the plurality of rolling elements, the second motor drivingly engaged to at least a second one of the plurality of rolling elements, the first one of the plurality of rolling elements and the second one of the plurality of rolling elements disposed on opposite sides of the swivel platform;

an on-board controller unit operatively connected to the actuator unit, the on-board controller unit operable to actuate the actuator unit; and wherein the frame includes a rigidifying structure extending in a transverse plane intersecting with the swivel platform, the first motor and the second motor disposed on opposite sides of the rigidifying structure.

14. The dolly as defined in claim 13, wherein the first motor has a first rotational axis and the second motor has a second rotational axis, the first rotational axis and the second rotational axis parallel with the transverse plane.

15. The dolly as defined in claim 14, wherein the first rotational axis and the second rotational axis are parallel with the rotational axes of the plurality of rolling elements.

16. The dolly as defined in claim 13, wherein the frame defines a first hollowed portion and a second hollowed portion extending at least partially under the swivel platform, the first hollowed portion receiving the first motor and the second hollowed portion receiving the second motor, the rigidifying structure defining a common wall between the first hollowed portion and the second hollowed portion.

17. The dolly as defined in claim 13, wherein the actuator unit includes a first torque transmitter axially mounted to the first motor and a second torque transmitted axially mounted to the second motor, the first torque transmitter and the second torque transmitter each coupled to the frame.

18. The dolly as defined in claim 17, wherein the first motor and the first torque transmitter are aligned along a common axis that is parallel with the rotational axis of at least the first one of the plurality of rolling elements.

19. The dolly as defined in claim 13, wherein the rotational axes of the plurality of rolling elements extend in a plane PPA extending between the load contacting surface of the dolly and the ground surface, a height defined between the load contacting surface of the dolly and the ground surface, the plane PPA extending at a distance between 30% and 50% of the height.

20. The dolly as defined in claim 1, wherein the rotational axes of the plurality of rolling elements extend in a plane PPA extending between the load contacting surface of the dolly and the ground surface, a height defined between the load contacting surface of the dolly and the ground surface, the plane PPA extending at a distance between 30% and 50% of the height.

\* \* \* \* \*